United States Patent [19]
Sugano et al.

[11] Patent Number: 5,481,378
[45] Date of Patent: Jan. 2, 1996

[54] IMAGE FORMING APPARATUS WITH AN UNAPPROVED COPY PREVENTING MEANS

[75] Inventors: Masashi Sugano; Yoshio Yamazaki; Masaaki Ikeda; Tadashi Izawa, all of Hachioji, Japan

[73] Assignee: Konica Corporation, Tokyo, Japan

[21] Appl. No.: 419,416

[22] Filed: Apr. 10, 1995

Related U.S. Application Data

[62] Division of Ser. No. 265,650, Jun. 24, 1994, Pat. No. 5,440,409.

[30]    Foreign Application Priority Data

Jul. 1, 1993   [JP]   Japan .................................. 5-163581

[51] Int. Cl.$^6$ ........................... H04N 1/23; H04N 1/44; H04N 1/50
[52] U.S. Cl. ....................... 358/501; 358/467; 358/468; 358/530; 355/201; 382/165; 283/902
[58] Field of Search ............................. 358/401, 442, 358/443, 448, 462, 467, 468, 501, 530; 355/201; 380/3, 5; 283/902; 382/165

[56]    References Cited

U.S. PATENT DOCUMENTS 4,586,811   5/1986   Kubo et al. ............................. 355/201

5,057,947   10/1991   Shimada ................................... 360/60
5,321,470   6/1994   Hasuo et al. ............................ 355/201

FOREIGN PATENT DOCUMENTS

| | | |
|---|---|---|
| 55-111977 | 8/1980 | Japan . |
| 1-316783 | 12/1989 | Japan . |
| 1-300285 | 12/1989 | Japan . |
| 2-55379 | 2/1990 | Japan . |
| 2-210481 | 8/1990 | Japan . |

*Primary Examiner*—Scott A. Rogers
*Attorney, Agent, or Firm*—Frishauf, Holtz, Goodman, Langer & Chick

[57]    ABSTRACT

An image forming apparatus, such as a copier, includes an unapproved copy preventor mechanism. The image forming apparatus includes a support such as a platen glass for supporting an original document; a light irradiation source for irradiating the original document with a light beam; and a detectors for detecting predetermined wavelength components of a reflected light from the original document which is irradiated with the irradiating light beam. The detector generates detection signals based on the detection of the predetermined wavelength components of the reflected light. An evaluator circuit determines whether the original document is a document which prohibits a production of an unapproved copy based on the detection signals.

11 Claims, 14 Drawing Sheets

Original (1st Generation)

2nd Generation Copy

Indication Caractor

Original (1st Generation)

Confidential — Red

2nd Generation Copy

Confidential — Purple Red or Blue

IMAGE FORMING APPARATUS WITH AN UNAPPROVED COPY PREVENTING MEANS

This is a division of application Ser. No. 08/265,650 filed Jun. 24, 1994, (now U.S. Pat. No. 5,440,409).

BACKGROUND OF THE INVENTION

The present invention relates to an image reproducing apparatus which reproduces an image by means of electrostatic photography, and more particularly relates to an image reproducing apparatus having a means for preventing the copying operation to illegally copy a secret document of an enterprise.

Recently, color image copiers of high-performance have come into wide use. Therefore, it is anticipated that paper money and securities are frequently counterfeited using the color image copier. In order to prevent the counterfeit of paper money and securities, the following technique has been disclosed in Japanese Patent Publication Open to Public Inspection No. 111977/1980:

When a color document is digitally read out so as to be copied, a specific pattern on the document is recognized using a signal that has been read out. In the case where the recognized pattern is of paper money or securities, the copying operation is stopped.

However, in some cases, the aforementioned recognition means for recognizing the specific pattern makes a mistake.

In order to prevent the occurrence of the mistake described above, Japanese Patent Publication Open to Public Inspection No. 300285/1989 discloses the following color copier:

The color copier includes a document scanning means by which a color document is subjected to color separation and the color-separated image is digitally read out. A color separation signal outputted form the document scanning means is converted into a density signal, and in accordance with the density signal, a color image is copied. The color copier comprises: a means for recognizing a specific pattern contained in the document, using the color separation signal; and a control means for repeatedly conducting the recognizing operation of the recognizing means each time the scanning operation is conducted, wherein the control means stops the copying operation when the recognizing means recognizes the specific pattern on the document. According to the above color copier, a plurality of pattern recognizing operations are repeatedly conducted on the same document to be copied, so that the accuracy of recognition can be improved.

According to Japanese Patent Publication Open to Public Inspection No. 316783/1989, the following copier is disclosed:

The copier comprises: a reading means for reading image information from a document; an image forming means for forming an image on a recording medium in accordance with the image information that has been read by the reading means; and a judging means for judging that the read document is prohibited from being copied, wherein the read image information is subjected to converting processing in accordance with the result of the judgment.

According to the disclosure of technique explained above, using the signals of R, G and B inputted from the reading means, documents are discriminated whether or not they agree with the characteristics of paper money or securities that have been previously set. In accordance with the result of the discrimination, it is finally discriminated whether or not they are paper money or securities. In the case where the result of the discrimination is YES, a conversion parameter is set in a specific processing circuit so that the document can not be faithfully copied. In this case, the discrimination is conducted as follows:

With respect to the inputted signals of R, G and B, a color spectrum of the document is compared with the data previously registered in a ROM, or alternatively an image pattern of a portion of the document or the entire document is compared with the pattern data previously registered in the ROM. Alternatively, the aforementioned two processes may be combined.

The characteristics of a document are extracted by a characteristic extraction circuit, and in accordance with the result of the characteristic discrimination, parameter conversion processing is carried out. With respect to the parameter conversion processing, the following methods are disclosed:

(1) Color conversion conducted according to a parameter of masking and UCR processing (2) Conversion of magnification, italic characters and mirror images (3) Edge emphasis, fine line processing, negative and positive conversion, and character pattern addition.

In order to prevent the counterfeit of paper money or securities when a document is copied in a printer, the following methods are disclosed: Video signals are sequentially monitored, and when it is judged that a document is paper money or securities, the images are subjected to the processing of thinning out, fine line, bold line, and screen pattern.

Further, according to Japanese Patent Publication Open to Public Inspection No. 55379/1990, the following method is disclosed:

For example, the pattern of a seal put on paper money or written contract, which appropriately expresses the characteristics of a specific document, is previously stored in the form of template information. When the template information is compared with an image outputted after processing, it is Judged whether or not it is a case of counterfeit. Specifically, the signals of R, G and B sent from the image reading unit pass through a comparator and AND gate. In the case of $R_L < R \leq R_H$, $G_L < G \leq G_H$, and $B_L < B \leq B_H$, it is judged that the color is a specific one. For example, it is judged that the image is a red seal of paper money.

The digital image signals R, B and G are inputted into the characteristic extraction circuit. The characteristic extraction circuit targets a specific pattern and color distribution, and conducts characteristic extraction processing. According to the result of the processing, a portion or an entire drive unit necessary for image formation is stopped. This technique is disclosed in Japanese Patent Publication Open to Public Inspection No. 210481/1990.

According to another known system, a document is provided with a mark by which the document can be easily recognized as an original sheet to be copied, or alternatively the document is provided with a second mark. Only when the copier detects the aforementioned mark or the second mark on the original sheet to be copied, copying operation is conducted. When the mark is not detected, the original sheet to be copied is not conveyed, or even when the original sheet to be copied is conveyed, image formation is not conducted, and the original sheet to be copied is discharged from the copier as it is, and a display means displays that the original sheet to be copied has been discharged. In this way, the counterfeit of paper money and securities can be prevented.

However, according to the above applications for preventing counterfeit, it is essentially necessary to provide a technique by which a specific pattern can be recognized. Therefore, the construction is complicated and the cost is increased, which is the first problem. Further, the conventional technique is mainly applied to digitally operated copiers.

In the case of a copier including a document scanning means by which a color document is subjected to color-separation and read out digitally, also including a means for recognizing a specific pattern on the document using a color-separation signal outputted from the document scanning means, the recognizing operation is affected by color ghost, so that a problem of malfunction is caused.

The phenomenon and cause of color ghost will be briefly described here. In the color copier, a document image is optically subjected to color-separation, so that it is separated to red and blue. Then, the red and blue images are respectively read out. In accordance with a signal sent from an individual image sensor (referred to as CCD hereinafter), a color of one pixel is determined. Therefore, when the position of CCD of red and that of blue deviate, a false signal of red or blue is generated although a line is black, which is referred to as color ghost. The causes of color ghost will be described as follows:

(1) Color ghost is caused due to pixel deviation between the CCDs caused when the accuracy of the mounted CCD is inappropriate, or when the CCD is deformed, or when the CCD deteriorates with age.

(2) Color ghost is caused when the magnification of red and that of blue are different, or when MTF of red and that of blue are different.

(3) Color ghost is caused when the output of red and that of blue are different due to chromatic aberration of a lens.

According to the recognition technique in which color-separation signals sent from the document scanning means are used, the characteristics of a specific document are made into a pattern so as to be compared. Therefore, a ratio of discrimination for discriminating the specific document is low, which is the second problem. In this case, MTF (Modulation Transfer Function) will be explained as follows.

A rate of deterioration of an image can be evaluated when the image is compared with the original document. However, its evaluation is not quantitative but qualitative. In order to quantitatively evaluate the rate of deterioration of an image, MTF used for evaluating a signal transfer system is adopted.

The modulation transfer function is expressed as follows.

$$MTF(\%) = (V_{max} - V_{min})/(V_{max} + V_{min}) \times 100$$

In the above expression, $V_{max}$ is the maximum density level of a substantial deteriorated waveform in the case where the waveform is read out by the CCD, and $V_{min}$ is the minimum density level of a substantial deteriorated waveform in the case where the waveform is read out by the CCD. In this case, signal deterioration is explained in the case where the image is read out by the CCD. In general, the MTF deteriorates while the image is recorded and reproduced. Deterioration factors of the MTF are an optical system, optical traveling system, processing circuit, and recording system. The following directly affect the deterioration of resolution: the MTF of the lens in the optical scanning system; the accuracy of a prism surface; the accuracy of mounting the CCD; the vibration of an optical mirror in the optical traveling system; and scanning speed.

Characteristics of the MTF are described as follows.

(1) Compared with the primary scanning direction, the MTF remarkably deteriorates in the subsidiary scanning direction.

(2) In order to improve the reproduction property of the finest portion of an image, the MTF value must be not less than 30%.

(3) Intensity of MTF correction must be determined in accordance with the reproduction property of fine lines and the photographic reproducing property.

According to the above recognition technique in which the color-separation signal sent from the document scanning means is used, a specific mark for specifying a document is blurred in some cases. In this case, it becomes difficult to extract the specific mark.

In the case where there are a large number of specific documents, it takes a good deal of time for the step of specifying the document and the step of judging the coincidence the specific document. Accordingly, the performance of the entire image forming apparatus is lowered, which is the third problem.

According to the image reproducing apparatus of the prior art and also according to the image reproducing apparatus of the present invention, it is possible to prevent a specific document from being copied. However, it is necessary for a specific person to copy the specific document for the purpose of providing information. In other words, information must be provided to the specific person. On the other hand, information must be kept secret from other persons. Specifically, the specific document is permitted to be copied by the first generation, and prohibited from being copied by the second and after generations.

SUMMARY OF THE INVENTION

The first object of the present invention is to provide an image reproducing apparatus in which a specific document can be securely prevented from being illegally copied, by using a simple and inexpensive means, wherein the means is capable of being applied to both digital and analog machines.

The second object of the present invention is to provide an image reproducing apparatus in which a specific document can be securely prevented from being illegally copied, by using a simple and inexpensive means.

The third object of the present invention is to provide an image reproducing apparatus in which the copying capability is not lowered even after a large number of specific documents have been registered, and the specific documents can be positively prevented from being copied even when the specific marks are blurred.

The fourth object of the present invention is to provide an image reproducing apparatus in which a specific document is permitted to be copied by the first generation, however, the specific document is prohibited from being copied by the second and after generations.

In order to accomplish the first object, the present invention is to provide an image reproducing apparatus in which a latent image is formed on an image forming body by a beam of light reflected from a document and the formed image is reproduced, the image reproducing apparatus comprising a control unit for discriminating the coincidence of a specific document by an electric signal outputted from a color detecting unit to detect a wavelength component of the beam of light reflected on the document.

The color detecting unit detects the under color of a document.

The color detecting unit is operated in a period of time until an exposure light source is stabilized.

The control unit continues processing while the result of discrimination or the motion of discrimination is made to be invalid.

In order to accomplish the second object, the present invention is to provide an image reproducing apparatus having an image reading means by which an image of a document stacked on a platen is color-separated and digitally read out, wherein color-separation is conducted by a digital signal outputted from the image reading means so that the color is separated to a recording color. In this image reproducing apparatus, a specific color region is provided in a color separation table by which a color is separated from the digital signal obtained by the image reading means in a preliminary scanning.

The present invention is to provide an image reproducing apparatus, wherein a setting means is provided, by which the specific color region is changed or added.

The present invention is to provide an image reproducing apparatus, wherein the setting means optically scans a specific document or a specific color coated on the specific document.

The setting means employs at least one of the control key, ID card and code number.

Color information exceeding the frequency corresponding to color ghost is used as effective data, wherein the color information is the digital image data in the sampling data obtained by preliminary scanning in a region except for the black region.

In the color separation table corresponding to the color information adopted for the effective data, a specific color region is set being extended at least in the setting time.

In order to accomplish the third object, the present invention is to provide an image reproducing apparatus having an image reading means by which an image of a document stacked on a platen is color-separated and digitally read out. The image reproducing apparatus comprises: a specific mark storage means for storing specific color region data corresponding to a specific mark color attached onto a specific document and also storing specific frequency data showing the number of dots composing a specific mark attached onto the specific document; a counting means for counting the number of sampling dots composing digital image data in the specific color region, wherein the digital image data is sampled in the preliminary scanning conducted previously to the image formation process; and a comparing means for comparing the counting data provided by the counting means with the specific frequency data.

The counting means counts the number of sampling dots of the specific mark except for an outer frame.

The counting means counts the number of sampling dots of the specific mark including an outer frame.

The image reproducing apparatus of the invention comprises: a blurred image detection means for detecting that the outer frame of the specific mark is blurred; and a discontinued image compensation means for compensating at least one of the primary scanning and the subsidiary scanning in accordance with the output of the blurred image detection means.

In order to accomplish the fourth object, the present invention is to provide an image reproducing apparatus having an image reading means by which an image of a document stacked on a platen is color-separated and digitally read out so that an image of a plurality of colors is reproduced in a plurality of image forming sections. The image reproducing apparatus comprises: a first judging means for outputting an output signal by which coincidence with a specific document is judged; a second Judging means for Judging a reproduced color; a warning and prohibiting means for warning and prohibiting an image forming motion in accordance with an output signal sent from the second judging means; and a releasing means for releasing the warning and the prohibition of the image forming motion, wherein the image forming operation is carried out while an image of a color except for black is added in accordance with an output signal sent from the releasing means, a coincidence signal sent from the first judging means, and a non-coincidence signal sent from the second judging means.

The first and second judging means are composed of a color separation table.

The color reproducing apparatus of the invention includes a memory which stores characters composing the specific mark attached onto the specific document, wherein the characters are stored in a half tone dot manner.

The color separation table will be explained here.

FIG. 6 is a conceptional view showing a color separation map employed in the image reproducing apparatus for accomplishing the first object of the present invention.

In this case, a color separation map for separating colors into red, blue and black will be explained here.

The color separation map is composed in the following manner:

Light reflected on the surface of a document is subjected to spectrography at the wavelength of about 540 nm. A coordinate surface of $V_r$ and $V_c$ is composed of a light intensity of a cyan component having a long wavelength region, and a light intensity of a red component having a short wavelength region. In the coordinate surface of $V_r$ and $V_c$, the colors of red, blue and black of the recording light are made to correspond with the density levels. In this case, on the coordinate surface $V_r$, $V_c$, the origin represents that the density is maximum. Accordingly, it should be noted that the density of a point is lowered when the point is separated from the origin. According to this color separation map, colors can be separated into three groups of red, blue and black not including the colors of green and purple. In this case, a sufficient boundary is provided between red and black for color separation, however, a sufficient boundary is not provided between black and blue for color separation. The map boundary is set, giving consideration to the compensation capability of color ghost described later.

FIG. 10 is a conceptional view showing a map employed in the image reproducing apparatus for accomplishing the second and third objects of the present invention.

On the color separation map shown in FIG. 10, a specific color region is provided, in which reflected light sent from the background of a specific document or the specific mark expressing the specific document is projected on the surface of the coordinate $V_r$, $V_c$. In FIG. 10, the reflected light is projected on the hatched region located in the red region. The reason why this region is selected is that a sufficient boundary is provided between red and black while consideration is given to the color ghost compensation capability. Other points are the same as those of the color separation map shown in FIG. 6. Therefore, explanations are omitted here.

FIG. 13 is a conceptional view showing a map employed in the image reproducing apparatus for accomplishing the third and fourth objects of the present invention.

On the color separation map shown in FIG. 10, a specific color region is provided, in which reflected light sent from the background of a specific document or the specific mark is projected onto the coordinate surface $V_r$, $V_c$ so that the first specific color region is formed, and further light reflected on the document background is projected on the coordinate surface $V_r$, $V_c$ so that the second specific color region is formed. In the second specific color region, the reproduction color is determined by the color code and density data. In this case, the first specific color region and the second specific color region are in the same red region, and only the density of the first specific color region and that of the second specific color region are different. However, the present invention is not limited to the specific pattern, and the specific color regions may be provided in different color regions.

DETAILED DESCRIPTION OF THE INVENTION

An example of the image reproducing apparatus to accomplish the first object of the present invention will be explained with reference to the accompanying drawings.

Figure 1:
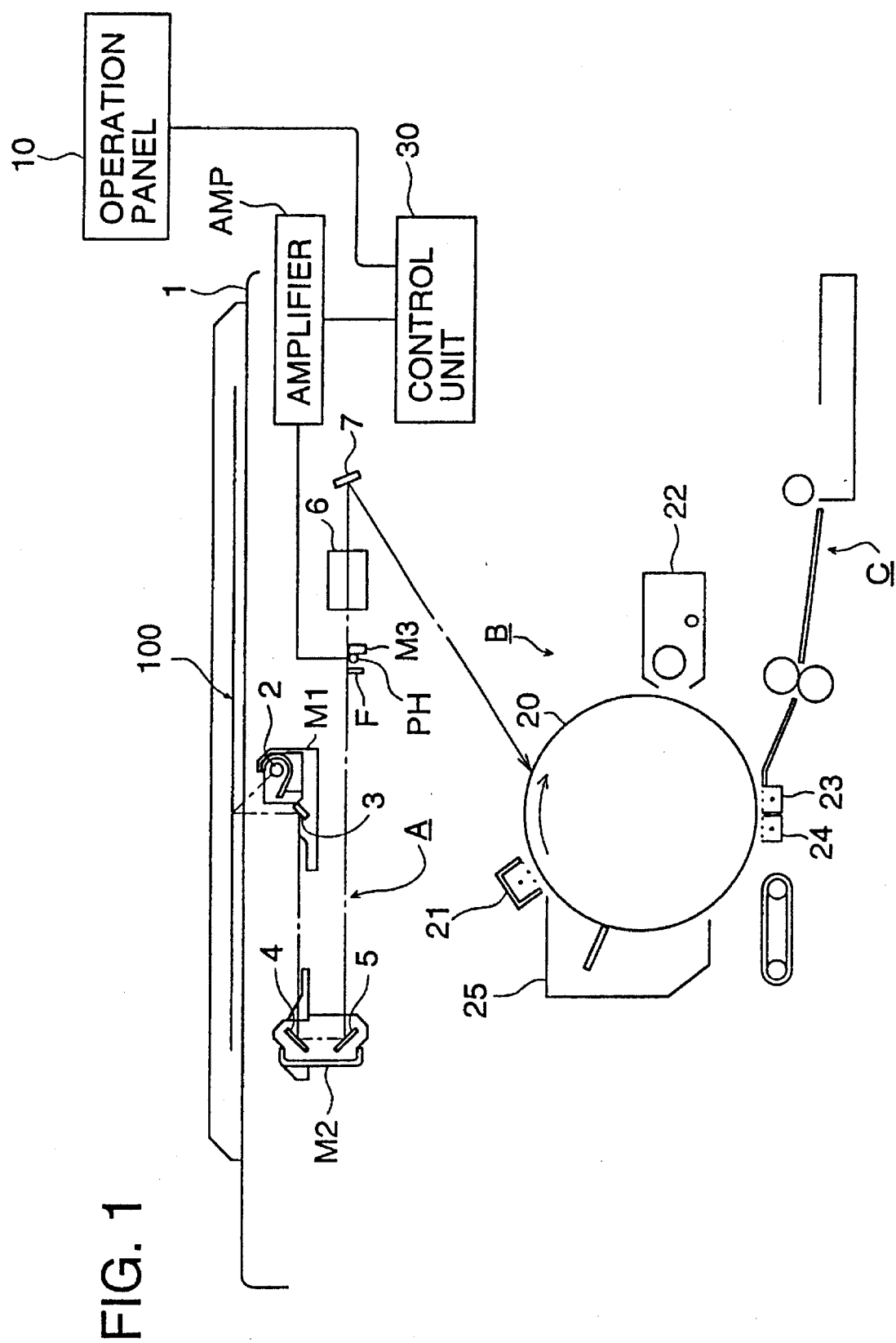
FIG. 1 is a schematic illustration showing the overall arrangement of an example of the image forming apparatus in which an analog system is used to accomplish the first object of the present invention.
Figure 2:
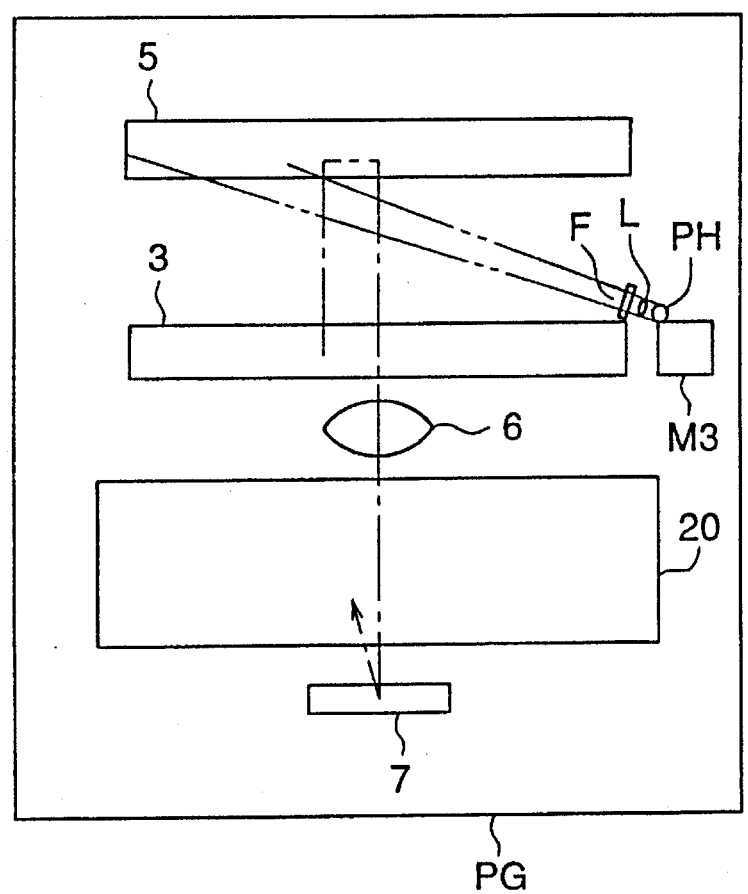
FIG. 2 is a plan view showing the optical scanning system of the image reproducing apparatus in which the analog system is applied.

FIG. 1 is an overall arrangement view of the image reproducing apparatus to accomplish the first object of the present invention. That is, FIG. 1 is a schematic illustration showing an outline of the construction of an example to which the analog system is applied. FIG. 2 is a plan view showing the optical scanning system of the image reproducing apparatus in which the analog system is applied.

As illustrated in FIG. 1, the image reproducing apparatus 100 comprises: a platen 1 made of platen glass (referred to as platen glass PG in this example hereinafter); a light source 2 for illuminating a document OG placed on the platen 1 with a beam of white light; a first mirror 3 mounted on a moving member M1 having the light source 2, wherein the first mirror 3 reflects a beam of light sent from the document OG; a V mirror unit M2 including a second mirror 4 and third mirror 5 which reflect the beam of light sent from the first mirror 3; an image formation lens 6 through which an image is formed on an image forming body 20 by the beam of light sent from the V mirror unit M2; and a fourth mirror 7 which reflects the beam of light sent from the image formation lens 6 to the image forming body 20. The image reproducing apparatus 100 further comprises: an analog type optical document scanning system A in which a beam of light reflected on the document is illuminated on the image forming body 20; an image formation processing section B for carrying out the electrostatic photographing process on the image forming body 20, the image formation processing section B including a scorotron charger 21, developing unit 22, transfer unit 23, separation unit 24, and cleaning unit 25; and a sheet supply system C for supplying recording sheets P to the transfer and separation section. When the electrostatic photographing processing is carried out, a document image can be formed on the recording sheet P which is formed, for example, of a single material, such as paper. The image reproducing apparatus further comprises a function for discriminating the coincidence with a specific document by an output signal sent from a color detecting section for detecting the wavelength component of a beam of light reflected on the background of the document OG.

In this example, the specific document is defined as an information transmitting medium such as a document and a drawing relating to the secret of an enterprise, wherein the specific document is stipulated in the illegal competition preventing law. For example, the confidential documents are controlled in an enterprise while a seal of "Confidential" is attached onto the documents. Color of the background of the confidential documents is red or blue, so that only specific persons can approach the confidential documents.

As illustrated in FIG. 2, the optical document scanning system A includes a color detecting section mounted on a member M3. In this case, the color detecting section is composed of a color filter F provided in an optical path between the third mirror 5 and the image formation lens 6, and only specific wavelength components can be transmitted through the color filter F, and also the color detecting section is composed of an image formation lens L for forming an image using a beam of light transmitted through the color filter F, and an optical sensor PH generating a current in accordance with the light intensity. The optical document scanning system A constructed in the manner described above forms an image on the optical sensor PH using integrated light sent from a rectangular region on the document surface.

Accordingly, when the image formation lens L (shown in FIG. 2) is adjusted, a region from which light is collected can be arbitrarily specified. The color filter F is characterized in that only the wavelength component reflected in accordance with the background color of the document OG can be transmitted through the filter F. Consequently, only when the wavelength component of light reflected on the background of the document is in a specific region, the light can be transmitted through the color filter F and received by the optical sensor PH, so that a current can be outputted in accordance with the light intensity. In other words, the optical sensor PH outputs a current in accordance with the light intensity of the wavelength component which is the same as the background color of the specific document.

The optical sensor PH is connected with a control section 30 through an amplifier AMP. Due to the foregoing, an output signal of the optical sensor PH is amplified to a signal level so that the signal can be processed by the control section 30. In the control section 30, a comparison is made between the level of the output signal sent from the optical sensor PH, and the signal level corresponding to density. According to the result of the comparison, it is discriminated whether or not the level of the output signal coincides with the density of the background of the specific document.

When an operation panel 10 is operated, the control section 30 controls the optical document scanning system A, image formation processing section B, and sheet supply system C, so that the image forming processing can be carried out.

Figure 3:
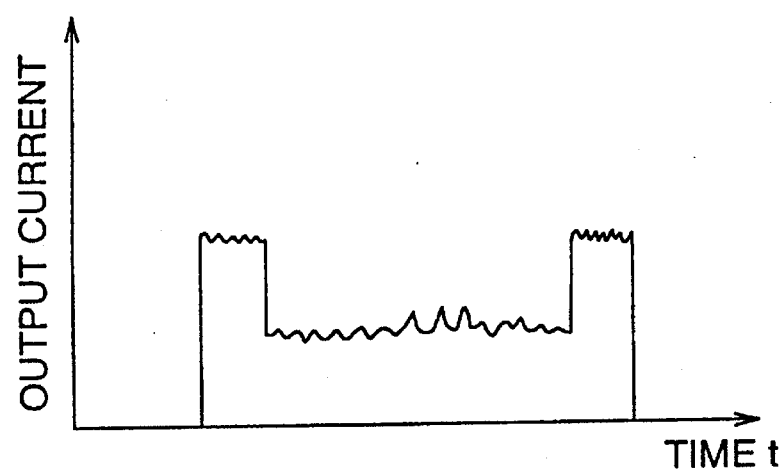
FIG. 3 is a graph showing an output current outputted from the optical sensor when a document is scanned by one scanning operation.

FIG. 3 is a graph showing an output current outputted from the optical sensor when a document is scanned by one scanning operation. As explained above, only the wavelength component corresponding to the background color of the specific document is transmitted through the color filter F. As shown in FIG. 3, a high level current is outputted at the first and second halves, which shows it is a non-image region in which an image such as characters does not exist. A region located between the first and second halves corresponds to the image region in which characters are written. Since black ink is used in the image region, light of all wavelength is absorbed, and the light collected to the optical sensor PH corresponds to the photographic density of the rectangular region. Therefore, the level of the output signal of the region in which characters are included is low compared with the level of the signal of the non-image region. In any cases, light of the wavelength component reflected by the background color of the specific document is detected.

With reference to FIGS. 1 to 4, the operation of the image reproducing apparatus of this example will be explained as follows.

An operator opens the platen cover PK, and sets a document OG on the platen glass PG. Then the operator sets the number of copies on the operation panel 10, and presses a copy switch. As illustrated in FIGS. 1 and 2, the control section 30 turns on the light source 2, and a beam of white light is illuminated on the document OG in such a manner that the illuminated portion is formed rectangular. In this way, scanning is conducted at a predetermined speed. By the control of the control section 30, the V mirror section M2 is moved in the same direction as that of the light source 2 at half speed. Due to the foregoing, a beam of reflected light sent from the document OG is received by the light sensor PH through the first, second and third mirrors 3, 4, 5. This is the pre-scanning operation conducted before the image forming operation. In general, in the analog type image reproducing apparatus, the pre-scanning operation is previously carried out for the purpose of automatically adjusting the copy density in accordance with the density of documents. In the pre-scanning operation, EE-processing is conducted, by which an appropriate density compensation patten, which is called a gamma table, is selected in accordance with a document density histogram, and also APS-processing is conducted, by which the document size is detected when the number of yellow bands of the platen cover is counted.

In the pre-scanning operation of this example, in addition to the EE and APS processing described above, the discrimination processing is also carried out, by which a discrimination is made between the document OG placed on the platen glass PG and the specific document, that is, it is discriminated whether or not the document OG coincides with the specific document.

Since the color filter F is provided, through which only wavelength component of light reflected by the background color of the specific document is transmitted, when a current is outputted from the optical sensor PH in the pre-scanning operation as shown in FIG. 3, it is possible to detect that the document OG placed on the platen glass PG coincides with the specific document when the output current of the optical sensor PH is detected by the control section 30. In the case where the document OG placed on the platen glass PG coincides with the specific document, a sign, such as "Confidential", "Unapproved Copy", "Enterprise Confidential", or "Business Confidential", is displayed on the control panel, and the image forming processing is not carried out. As described above, in the image reproducing apparatus of this example, whether or not the document placed on the platen glass coincides with the specific document is judged by the color. Therefore, it is not necessary to use a complicated pattern recognizing circuit for preventing the illegal copying operation. Since the background color of the document is detected, the specific document can be discriminated approximately perfectly.

In the case where the color filter F is provided in the optical document scanning system A, through which only wavelength component of light reflected by the background color of the specific document is transmitted, the specific document may be discriminated not only in the pre-scanning operation but also in the image forming process.

In the example, the color filter F has the spectral characteristics in which the wavelength component of a beam of light reflected by the background color of the specific document can be transmitted through the filter F. However, the present invention is not limited to the specific embodiment. Of course, a color filter may be employed, through which the wavelength component of a beam of light reflected by the color of the mark attached to the specific document can be transmitted.

In the case where the color filter F is not provided in the optical document scanning system A, through which only wavelength component of light reflected by the background color of the specific document is transmitted, the same discrimination processing can be carried out.

Figure 4:
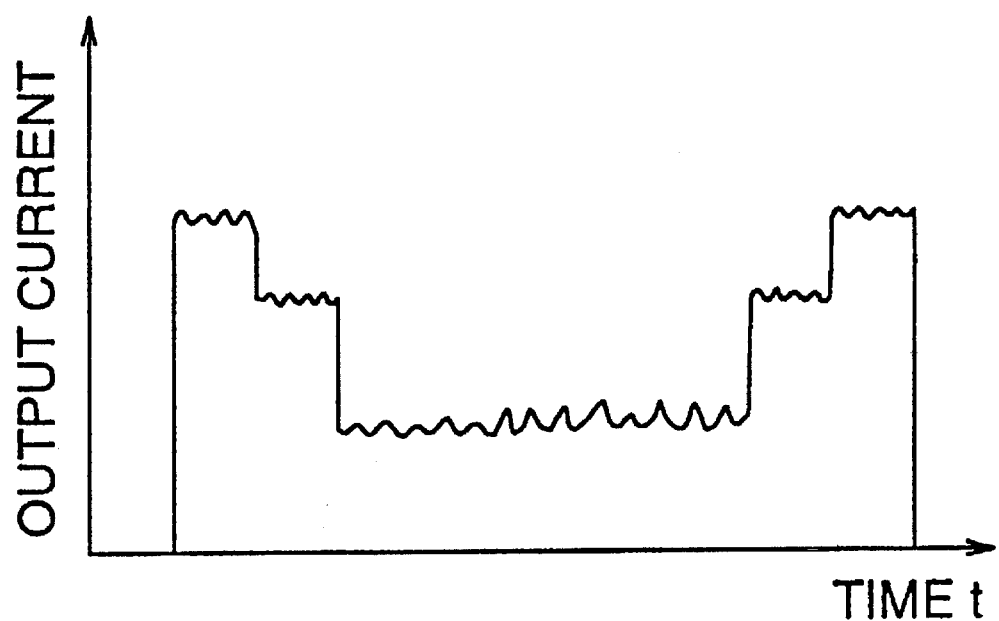
FIG. 4 is a graph showing an output current outputted from the conventional optical sensor when a document is scanned by one scanning operation.

FIG. 4 is a graph showing an output current outputted from the conventional optical sensor when a document is scanned by one scanning operation. In the graph, is shown a density distribution in the wavelength region peculiar to the optical sensor. The graph shows that the output level can be classified into three stages. The maximum level regions formed at both ends of the graph show the level of the output current corresponding to light reflected on the platen cover PG. It is shown that there is no document at both ends of this graph. The region of the medium level shows the level of the output current corresponding to light reflected by the non-image region of the document. The region of the low level shows the level of the output current corresponding to light reflected by the image region of the document. Consequently, when the data of the medium level is previously provided, the specific document can be specified from the background color even if the color filter F is not used.

When the pre-scanning operation is carried out in the beginning after the light source 2 has been turned on, the same discrimination processing can be carried out even if the color filter F, through which the wavelength component of light reflected by the background color of the specific document can be transmitted, is not provided in the optical document scanning system A. Specifically, unless a predetermined period of time, for example, one second has passed after the light source 2 was turned on, the output of the light source 2 can not be stabilized. While the output of the light source 2 is not stabilized, the intensity of light emitting energy is low, and the wavelength of emitted light deviates to a specific region, for example, the wavelength of emitted light deviates to a wavelength region corresponding to red. When a document is scanned with the light source 2 at this time, the wavelength of light reflected by the regions corresponding to red and white is the same as the wavelength of red. In this case, even when a color filter is not used, the background color of a specific document can be detected. When the pre-scanning operation is carried out in this period of time, the capacity of the image reproducing apparatus can be improved, for example, the throughput (the number of copies per one minute) can be increased.

Next, an example of the digital type image reproducing apparatus for accomplishing the first object of the present invention will be explained as follows.

Figure 15:
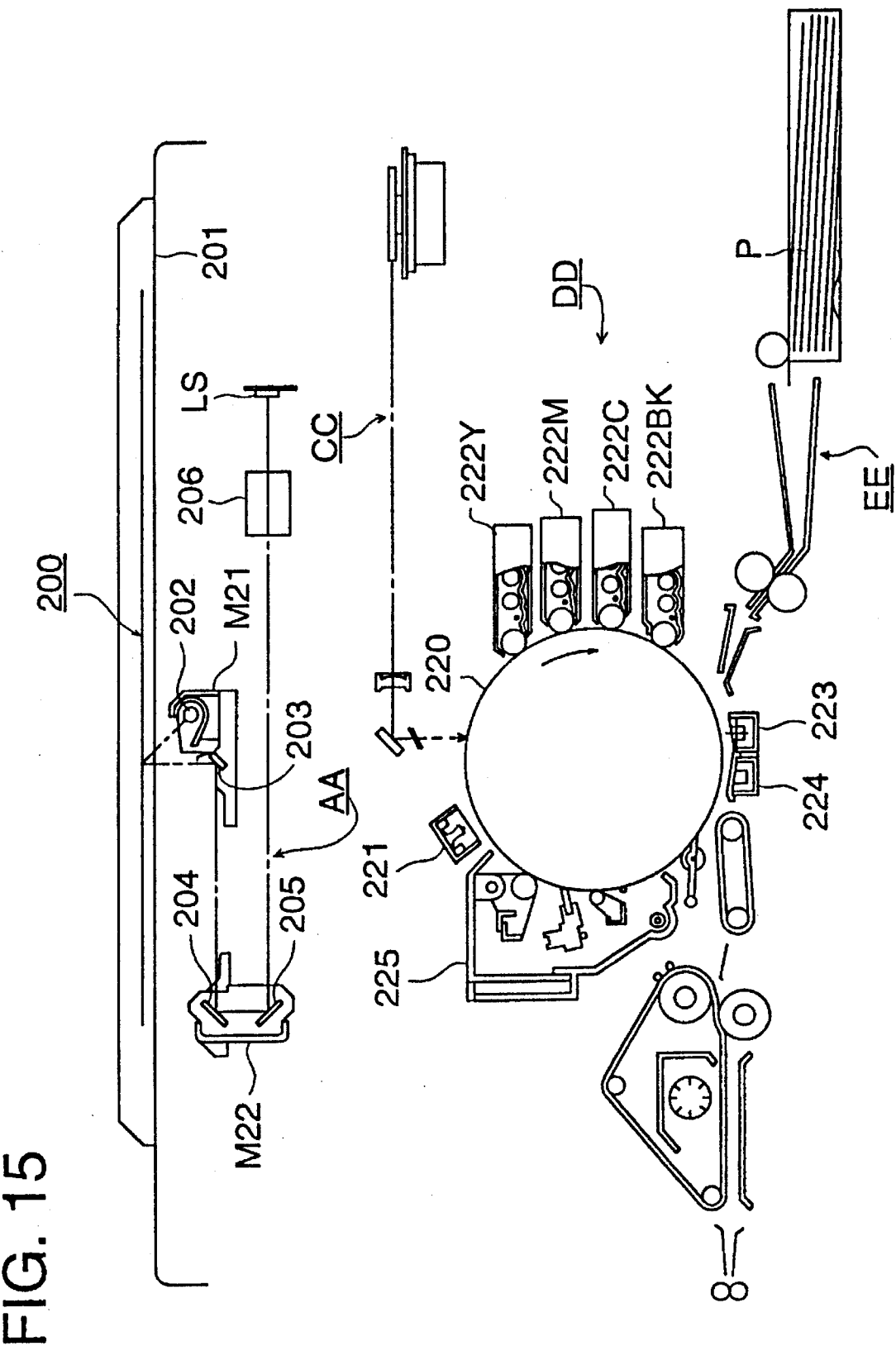
FIG. 15 is a sectional view showing an outline of the construction of the image reproducing apparatus in which a digital system, which is called a "Konica New Color" is employed.

FIG. 15 is a sectional view showing an outline of the construction of the digital type image reproducing apparatus to which KNC (Konica New Color) process is applied.

As illustrated in FIG. 15, the image reproducing apparatus 200 comprises: a platen 201 made of platen glass (referred to as platen glass PG in this example hereinafter); a light source 202 for illuminating a document OG placed on the platen 201 with a beam of white light; a first mirror 203 mounted on a moving member M1 having the light source 202, wherein the first mirror 203 reflects a beam of light sent from the document OG; a V mirror unit M22 including a second mirror 204 and third mirror 205 which reflect the beam of light sent from the first mirror 203; and an image formation lens 206 through which an image is formed on a line sensor LS1 for red and a line sensor LS2 for cyan through a dichroic mirror (shown by DM in FIG. 5). These units compose an image reading section AA. The image reproducing apparatus 200 also comprises: an image processing section BB in which a digital image signal sent from the image reading section AA is converted into a color signal corresponding to a recording color; a writing section CC which emits a laser beam in accordance with a recording signal and conducts scanning on the image forming body 220 for each dot; an image formation processing section DD including a scorotron charger 221, developing units 222Y, 222M, 222C, 222BK, transfer unit 2223, separating unit 2224, and cleaning unit 225, wherein electrostatic photographic processing is carried out in the image formation processing section DD; and a sheet feeding system EE which feeds recording sheets P to the transfer and separation sections. When the electrostatic photographing processing is carried out in the above apparatus, a color image of the document is reproduced on the recording sheet P. The digital type image reproducing apparatus described in this specification will be explained in accordance with the above construction.

The image reproducing apparatus 200 of this example is further provided with a function in which the coincidence with a specific document is discriminated by an output signal sent from the color detecting section for detecting the wavelength component of light reflected by the background of the document OG.

Figure 5:
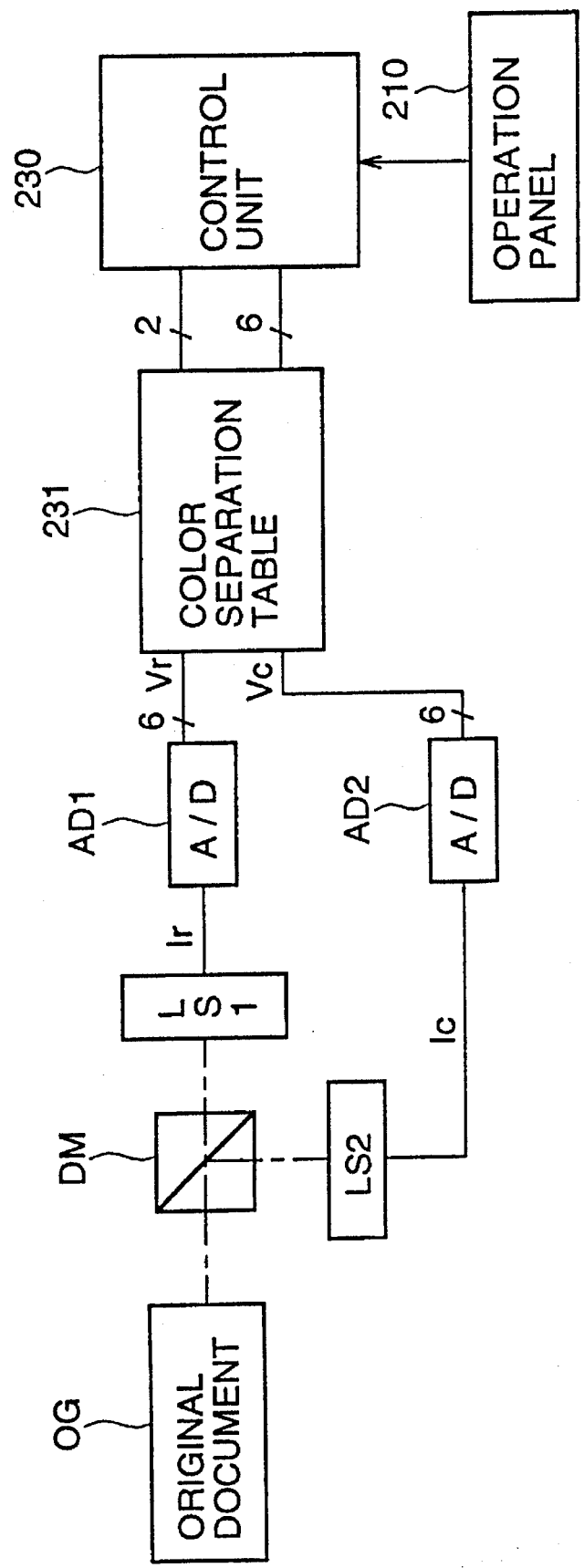
FIG. 5 is a block diagram showing the essential construction of the digital image reproducing apparatus to accomplish the first object of the present invention.

FIG. 5 is a block diagram showing the essential construction of the digital image reproducing apparatus to accomplish the first object of the present invention.

In FIG. 5, the document OG is placed on the platen glass PG. Light reflected by the document OG is projected to the dichroic mirror DM composing the optical image reading system AA shown in FIG. 15. Then the light is subjected to spectral processing by the dichroic mirror so as to be separated to red and cyan images. After that, the images are respectively formed on the line sensors LS1 and LS2. In this case, the cutoff wave length of the dichroic mirror DM is about 540 nm. Due to the foregoing, the red component is transmitted and the cyan component is reflected. The line sensors LS1 and LS2 respectively output currents $I_R$ and $I_C$ in accordance with the light intensity. These line sensors LS1 and LS2 are included in the image reading section AA. These currents $I_R$ and $I_C$ are subjected to shading-compensation by the A/D converters AD1 and AD2. At the same time, these currents $I_R$ and $I_C$ are A/D-converted into digital image signals $V_r$ and $V_c$ of 6 bits, and sent to the color separation table 231. The digital signal $V_r$ shows a density level of the red component, and the digital signal $V_c$ shows a density level of the cyan component of the document image.

Figure 6:
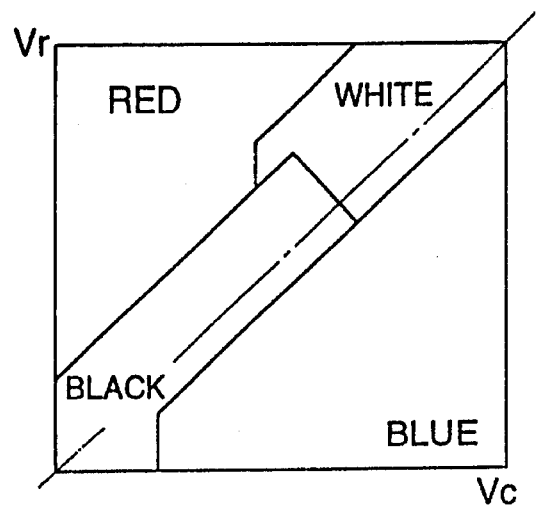
FIG. 6 is a conceptional view of the color separation map employed in the image reproducing apparatus to accomplish the first object of the present invention.

A high speed ROM is used for the color separation table 231, and predetermined data is previously written in the color separation table 231 as shown in FIG. 6. Specifically, 8 bit data is written in the color separation table, wherein the 8 bit data relates to the recording color corresponding to the 6 bit digital image signal $V_r$ showing the density level of the red component, and also corresponding to the 6 bit digital image signal $V_c$ showing the density level of the cyan component. In this case, the data relating to the recording color composing the color separation table 231 is, for example, the 2 bit color code data for designating the color of developer, and the 6 bit density data for determining the density of the recording color. Consequently, the color separation table 231 outputs the data relating to the recording color in the form of a color signal.

The color codes are determined by the specification. For example, the color codes are shown in Table 1.

TABLE 1

| Color | Code |
|---|---|
| Black | 00 |
| Blue | 01 |
| Red | 10 |
| White | 11 |

The density data is expressed as follows.

[Density data]=$(V_r+V_c)/2$

As expressed above, the density data is obtained when the density level of the cyan component and that of the red component are averaged. In this example, this density data is not used, so that it is not so important.

Since the color separation table 231 is constructed in the manner described above, a color signal of 8 bits can be outputted, wherein the color signal is composed of color code and density data of the recording color corresponding to the digital image signals $V_r$ and $V_c$.

In this example, the image processing section BB is composed of the A/D converters AD1, AD2 and the color separation table 231. In this case, the color separation table 231 corresponds to the color detecting section.

The control section 230 discriminates whether or not the color code data composing the color signal coincides with the color code data corresponding to the background color of a specific document. Specifically, the color separation table 231 is exclusively used for pre-scanning, and a color separation table exclusively used for image formation processing is separately provided, which will not be explained in detail here.

In accordance with the inputted signal sent from the operation panel 10, the control section 230 controls the image reading section AA, image processing section BB, writing section CC, image formation processing section DD, and sheet supply section EE, so that image formation processing can be carried out. In this connection, the control section 230 carries out the ACS processing, EE processing, and APS processing, and each processing will be explained below. By the ACS processing, the color codes of red, blue and black are counted through pre-scanning so that the document color is judged. By EE processing, an appropriate density compensation patten, which is called a gamma table, is selected in accordance with a document density histogram. By the APS processing, the document size is detected when the number of yellow bands of the platen cover is counted. The detail of the processing will not be explained here since it is not related to the present invention.

In this case, the operation of the image reading section AA in pre-scanning will be briefly explained here, and also the density distribution on a typical document will be briefly explained here.

Figure 7:
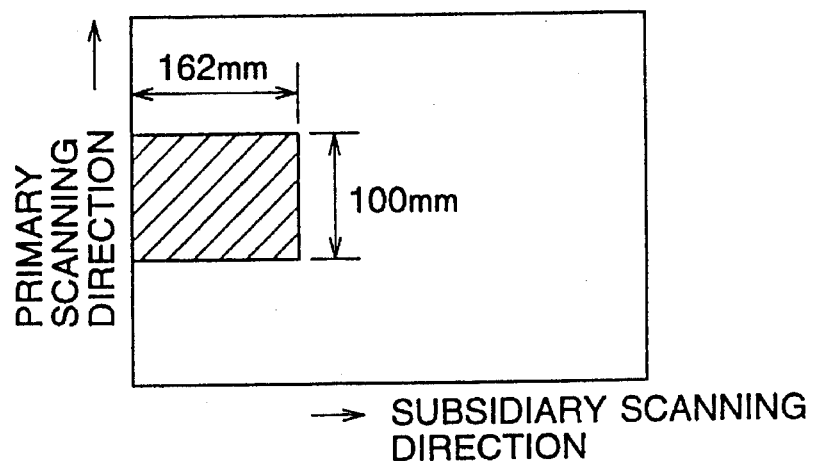
FIG. 7 is a view showing a model of the scanning range in the pre-scanning operation of the image reading section AA of the present invention.

FIG. 7 is a view showing a model of the scanning range in the pre-scanning operation of the image reading section AA of the present invention.

As shown in FIG. 7, a sampling range used for discrimination processing is 100 mm long in the primary scanning direction, and 162 mm long in the subsidiary scanning direction. For example, sampling of data is conducted for each 1 mm in the primary scanning direction and for each 0.25 mm in the subsidiary direction. Therefore, about 64800 points of sampling data can be provided.

Figure 8:
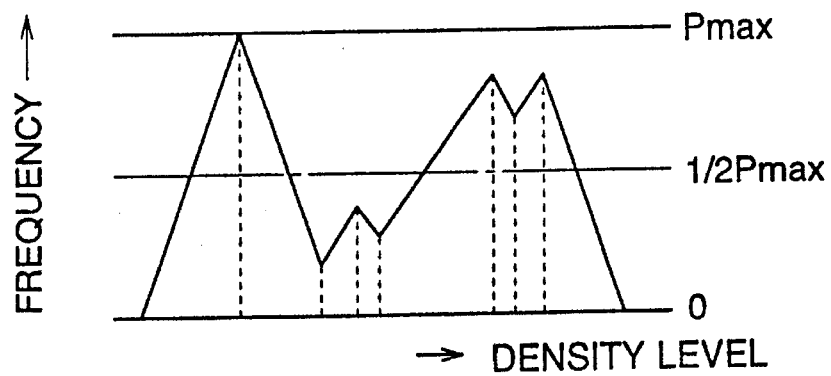
FIG. 8 is a graph showing the frequency distribution of a typical density level obtained in the pre-scanning.

FIG. 8 is a graph showing the typical frequency distribution of density level obtained through pre-scanning.

In FIG. 8, in general, the density level of the background of a document is expressed by the maximum frequency $P_{max}$, and the density level of characters is expressed by the second maximum frequency $½P_{max}$.

With reference to FIGS. 5 to 8 and FIG. 15, the pre-scanning processing operation of the image reproducing apparatus 200 of this example will be described as follows.

First, the operator opens the platen cover and puts the document OG on the platen glass PG. Then the operator sets the number of copies using the operation panel 210, and presses the copy switch. As illustrated in FIG. 15, the control section 230 turns on the light source 202. Then the light source 202 is moved at a predetermined speed while the light source 202 illuminates the surface of the document OG with white light, the illuminated portion being formed rectangular. The control section 230 moves the V mirror section M22 at half the speed of the light source 202 in the same direction as that of the light source 202. Due to the foregoing, the document OG is scanned. A beam of light reflected on the surface of the document OG is reflected by the first, second and third mirrors 203, 204, 205. Then the beam of light is divided into a red and a cyan component by the action of the dichroic mirror DM. Then a red image is formed on the red line sensor LS1 by the image formation lens 206, and a cyan image is formed on the cyan line sensor LS2. The scanning conducted by the image reading section AA is the pre-scanning conducted before the image formation process. Electric currents $I_R$ and $I_C$ outputted from the red and cyan line sensors LS1 and LS2 in the pre-scanning, are respectively subjected to shading compensation by the A/D converters AD1 and AD2. At the same time, the currents are subjected to the A/D conversion, so that the currents are converted into the digital image signals $V_r$ and $V_C$ of 6 bits, and then the image signals are sent to the color separation table 231. The color separation table 231 sends a color signal of 8 bits corresponding to the digital image signal to the control section 230.

The control section 230 makes a comparison between the color code data of 2 bits composing a color signal and the predetermined data corresponding to the background color of the specific document, and a discrimination is made to judge whether the color code data coincides with the predetermined data. In this way, it is discriminated whether or not the document OG put on the platen glass PG is the specific document. As a result of the forgoing, the control section 230 displays the sign, such as "Confidential", "Unapproved Copy", "Enterprise Confidential", or "Business Confidential", on the display provided on the control panel, and the image formation process is not carried out. As described above, the image reproducing apparatus of this example discriminates the specific document by the color, so that a complicated pattern discrimination circuit is not required to prevent an illegal copying operation. Since the background color is detected, the specific document can be perfectly discriminated.

Output of the light source 202 is not stabilized unless a predetermined period of time, for example, one second passes after the power source was turned on. In the period of time in which the output of the light source 202 is not stabilized, the light emitting energy is so low that the wavelength of emitted light deviates to a specific wavelength region, for example, the wavelength of emitted light deviates to a wavelength region of red. When the document OG is scanned by the light source 202 in this period of time, the wavelength of light reflected from a red and a white region is the same as the wavelength corresponding to red. In the case where the background color of the specific document is red, it is possible to detect the reflected light. Accordingly, when the pre-scanning operation is carried out in this period of time, the performance of the image reproducing apparatus can be improved, for example, the throughput can be enhanced.

According to the above two examples, the color detecting means detects the wavelength component of light reflected on the surface of the document OG, and an electric signal is outputted from the color detecting means. By this electric signal, the control section 230 discriminates whether or not the document OG placed on the platen glass PG coincides with the specific document. In this way, the specific document is discriminated by its color. Accordingly, a complicated pattern discriminating circuit is not required. Further, the image reproducing apparatus can be applied to both the digital and analog machines. When the background color of the document is detected, the specific document can be approximately perfectly discriminated.

Next, an example of the image reproducing apparatus to accomplish the second object of the present invention will be explained as follows.

The image reproducing apparatus to accomplish the second object of the present invention is applied to the digital system. The digital image reproducing apparatus 200 to which what is called KNC process is applied, was already explained with reference to FIG. 15. Since the pre-scanning operation of the image reading section AA and the density distribution on a standard document were briefly explained before, the explanation will be omitted here.

Figure 9:
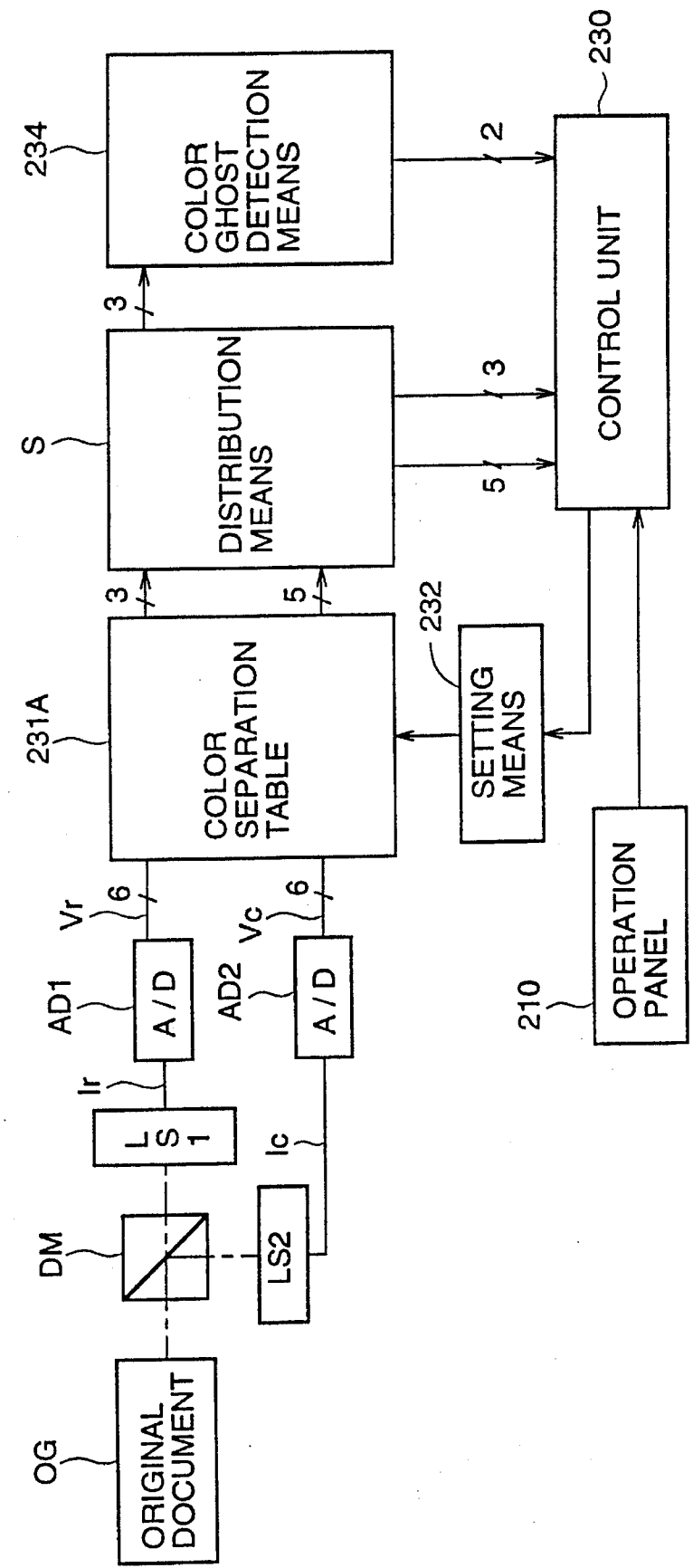
FIG. 9 is a block diagram showing the essential construction of the image reproducing apparatus to accomplish the second object of the present invention.

FIG. 9 is a block diagram showing the primary portion of an example of the image reproducing apparatus to accomplish the second object of the present invention.

The image reading section AA was already explained with reference to FIGS. 5 and 15, so that the detailed explanation will be omitted here. The document OG is placed on the platen glass PG. The cutoff wavelength of the dichroic mirror DM is about 540 nm. Due to the foregoing, a red component is transmitted and a cyan component is reflected. The line sensors LS1 and LS2 outputs the currents $I_R$ and $I_C$ in accordance with the intensity of received light, wherein the currents are outputted by the unit of a pixel.

In this example, the following new construction is provided. The image processing section BB includes a color ghost detecting means 234 and setting means 232. Further, a distribution means S is provided for connecting the color ghost detecting means 234 with the color separation table 231A and the control section 230.

Figure 10:
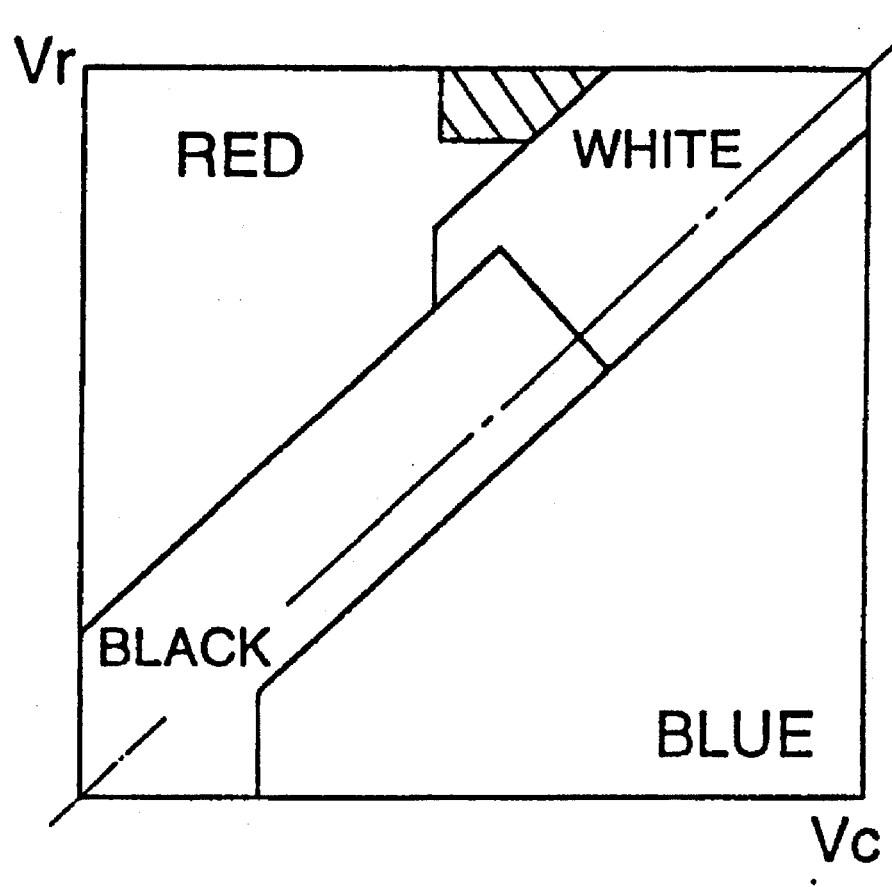
FIG. 10 is a conceptional view of the color separation map employed in the image reproducing apparatus to accomplish the second and third objects of the present invention.

For the color separation table 231A, a high speed ROM is used. In the color separation table 231A, the predetermined data shown in the color separation map illustrated in FIG. 10 is written in. The digital image signal $V_r$ of 6 bits shows the density level of a red component, and the digital image signal $V_c$ of 6 bits shows the density level of a cyan component. Specifically, the color signal data of 8 bits of the recording colors corresponding to the digital image signals $V_r$ and $V_c$ is written in the color separation table. In this case, the color signal data relating to the recording colors composing the color separation table, includes the color code data of 2 bits for designating the color of developer, the specific color code data of 1 bit for showing the specific color, and the density data of 5 bits for determining the density of the recording color. Consequently, the color separation table 231 outputs the data relating to the recording color in the form of a color signal. Concerning the color signal, as compared with the digital image signals $V_r$ and $V_c$, the gradation level of the density signal is lowered. The reason is that the density region of the low density level is cut off because the frequency of the color of low density level is experientially low.

Specifically, the color separation table 231A is exclusively used for pre-scanning. In this example, a color separation table exclusively used for image forming process is separately provided. The detailed explanation of the color separation table will be omitted here.

The specific code data is defined as the code data that shows the wavelength of light reflected by the background color of the specific document or reflected by the color of a mark attached onto the specific document. In this example, the bit of the code data corresponds to the LMB of the color code data.

The color code is determined by the specification. For example, the color code is shown in Table 2.

TABLE 2

| Color | Color Code | Specific Code |
|-------|------------|---------------|
| Black | 0 | 00 |
| Blue | 0 | 01 |
| Red | 0 | 10 |
| Red | 1 | 10 |
| White | 0 | 11 |

According to the color separation map shown in FIG. 10, the specific region, corresponding "1" of the specific code data, is provided in the red region. Therefore, the color code is "110". However, the present invention is not limited to the above embodiment, and the specific region may be provided in either of the regions in the color separation map shown in FIG. 10, and further a plurality of regions may be set by the setting means 232 described later.

The density data can be expressed by the following expression.

$$\text{(Density data)} = (V_r + V_c)/2$$

As expressed by the above expression, the density data is found when the density level of the cyan component and that of the red component are averaged.

When the color separation table 231A is constructed in the manner described above, a color signal of 8 bits can be outputted which is composed of color code data and density data corresponding to the recording color determined by the digital image signals $V_r$ and $V_c$.

By the setting means 232, a change or addition of the specific region in the color separation map shown in FIG. 10 can be set in the color separation table 231A. Specifically, when LMB in the color code data written in the ROM is rewritten by the ten keys disposed on the operation panel, the specific color region can be changed or added.

Unless at least one of the control key, ID card and code number is used, this setting operation can not be conducted. In this case, the control key is defined as a key for permitting the peculiar adjusting condition to be set on the image reproducing apparatus 200, and the ID card or the code number is used for discriminating a person or a section in the office to use the image reproducing apparatus, and the setting condition of the image reproducing apparatus 200 can be changed by the ID card or the code number. When the ID card or the code number is used together with the control key, the specific document can be prevented from being illegally copied.

Further, the specific color region expressing the background color of the specific document may be determined when the document OG placed on the platen glass PG is read and scanned. In the setting of the specific color region, a value obtained by the actual scanning operation is of a background color of a sheet of specific document; therefore, the color region obtained by the value expresses only a point in the color separation map. Therefore, even a small fluctuation of the background color of the specific document can not be allowed. For this reason, it is actually necessary to provide an allowance to the region when the specific color region is determined. Therefore, in this embodiment, the specific color region is determined in such a manner that the background color read from the specific document is enhanced according to an allowable range which is an experimental value.

The distribution means S distributes the color signal of 8 bits sent out from the color separation table 231A to the color ghost detecting means 234 and control section 230.

The color ghost detecting means 234 detects a slender color zone at the edge of a black image, and also detects a slender color zone where the color is changed. In this case, the slender color zone is detected as ghost. For example, the detection is conducted by a color pattern method, which will be described as follows:

When 7 pixels including the target pixel coincide with the previously stored color pattern, the target pixel is determined to be ghost. Specifically, the color ghost detecting means 234 is a color ghost table written on the high speed ROM. In this case, the color ghost table includes: a color pattern that is a row of color code data corresponding to the 7 pixels containing the target pixel and peripheral pixels; and ghost data that is the code data showing whether or not the target pixel is color ghost. In this case, the color ghost detecting means 234 is operated in the following manner. The color code signal sent out from the color separation means 235 is compared with the color pattern at the unit of 7 pixels, and sends the ghost data to the control section 230.

Table 3 shows an example of the color ghost table in a normal reading mode.

TABLE 3

| | Color Pattern | | |
|---|---|---|---|
| Number | Peripheral Pixel | Target Pixel Peripheral Pixel | Ghost Data |
| 1 | White White Blue | Blue Black Black Black | 11 |
| 2 | White White Blue | Blue White White White | 00 |
| 3 | White White White | Red Black Black Black | 11 |
| 4 | White White Red | Red Red White White | 00 |

In table 3, numerals show the order of disposition to be written in the color ghost table. This order of disposition is mainly used in the case of correction. The color pattern shows a color code signal row for comparing the target pixel with the 6 peripheral pixels. Ghost data is added forming a pair with the color pattern. For example, the color ghost detecting means 234 operates in the following manner. When a color code signal row corresponding to 7 pixels sent out from the distribution means S coincides with the color pattern shown by numerals 1 and 3, the ghost data "11" showing the occurrence of color ghost at the edge of a black image. On the other hand, when the color ghost detecting means detects that the color code signal row corresponding to the 7 pixels sent out from the distribution means S has coincided with the color patterns shown by the numerals 2 and 4, the ghost data "00" showing that there is no color ghost is sent out.

The control section 230 operates as follows. First, the effective data is adopted in the following manner. Sampling data is obtained by preliminary scanning. In the sampling data, digital image data in a region except for a black region in the color separation map shown in FIG. 8 is used as the effective data, wherein the digital image data is color information, the frequency of which exceeds that of the color ghost. Specifically, in order to make a histogram showing the density distribution for each color code as illustrated in FIG. 10, a density code counter NC for counting the density code is provided, and also a ghost counter GC for counting the frequency of color ghost is provided. When these counters are provided, a histogram for showing the density distribution for each color code is made. The frequency corresponding to color ghost is subtracted from the histogram of a color region except for the color code "00". According to the histogram on which the subtraction has been conducted, discrimination processing is carried out for discriminating the document OG placed on the platen glass PG from the specific document.

In this connection, the control section 230 conducts, the ACS processing, EE processing and APS processing. In the ACS processing, the color codes of red, blue and black are counted by pre-scanning so that the document color is judged. In the EE processing, in order to automatically copy in accordance with the document density, an appropriate density compensation pattern is selected from the document density histogram, that is, what is called a gamma table is selected. In the APS processing, when the number of yellow bands of the platen cover is counted, the document size is detected. Explanations of the aforementioned processing will be omitted here.

With reference to FIGS. 9, 10 and 15, the operation of pre-scanning of the image reproducing apparatus 200 of this example will be explained as follows.

First, the operator opens the platen cover and puts the document OG on the platen glass PG. Then the operator sets the number of copies using the operation panel 210, and presses the copy switch. As illustrated in FIG. 15, the control section 230 turns on the light source 202. Then the light source 202 is moved at a predetermined speed while the light source 202 illuminates the surface of the document OG with white light, the illuminated portion being formed rectangular. The control section 230 moves the V mirror section M22 at half the speed of the light source 202 in the same direction as that of the light source 202. Due to the foregoing, the document OG is scanned. A beam of light reflected on the surface of the document OG is reflected by the first, second and third mirrors 203, 204, 205. Then the beam of light is divided into a red and a cyan component by the action of the dichroic mirror DM. Then a red image is formed on the red line sensor LS1 by the image formation lens 206, and a cyan image is formed on the cyan line sensor LS2. The scanning conducted by the image reading section AA is the pre-scanning conducted before the image formation process.

A sampling range for discrimination processing is 100 mm in the primary scanning direction shown by hatched lines in FIG. 7, and 162 mm in the subsidiary scanning direction. For example, data is sampled for each 1 mm in the primary scanning direction and 0.25 mm in the subsidiary scanning direction. Accordingly, sampling data of 64800 points can be obtained.

Electric currents $I_R$ and $I_C$ outputted from the red and cyan line sensors LS1 and LS2 in the pre-scanning, are respectively subjected to shading compensation by the A/D converters AD1 and AD2. At the same time, the currents are subjected to the A/D conversion, so that the currents are converted into the digital image signals $V_r$ and $V_C$ of 6 bits, and then the image signals are sent to the color separation table 231A. The color separation table 231A sends a color signal of 8 bits corresponding to the digital image signal to the distribution means S. The distribution means S sends only the color code to the color ghost detecting means 234, and synchronously sends a color signal of 8 bits to the control section 230.

When the color ghost detecting means 234 detects that a color code signal row corresponding to 7 pixels sent out from the distribution means S has coincided with the color patterns of numerals 1 and 3 shown on Table 3, the ghost data "11" showing that color ghost has occurred at the edge of a black image is sent out to the control section 230.

When the color ghost detecting means 234 detects that a color code signal row corresponding to 7 pixels sent out from the distribution means S has coincided with the color patterns of numerals 2 and 4 shown on Table 3, the ghost data "00" showing that there is no color ghost is sent out to the control section 230.

The control section 230 operates as follows. The sampling dot number of the density code, the value of which is the same for each color code, is counted by the density code counter NC, and the histogram of density level is is made. On the other hand, the control section 230 counts the ghost data caused in a region except for the black region in the color separation map, by the ghost counter GC. The control section 230 compares the effective color data, which is subtracted the sampling dot number corresponding the color ghost from the histogram data, with the frequency data that has been previously set. In this way, the document OG placed on the platen glass PG is discriminated from the specific document. Due to the foregoing, the specific document is discriminated without being affected by (1) the mounting accuracy of the CCD, and the slippage of pixels caused by the deformation and lapse pf time of the CCD, (2) disagreement of the magnification of red and blue, and MTF, and (3) color ghost caused by the level difference between the outputs of red and blue caused by chromatic aberration. Further, without comparing complicated patterns, the specific document can be discriminated. The present invention provides an image reproducing apparatus having the aforementioned characteristics.

An example of the image reproducing apparatus to accomplish the third object of the present invention will be explained as follows.

Figure 11:
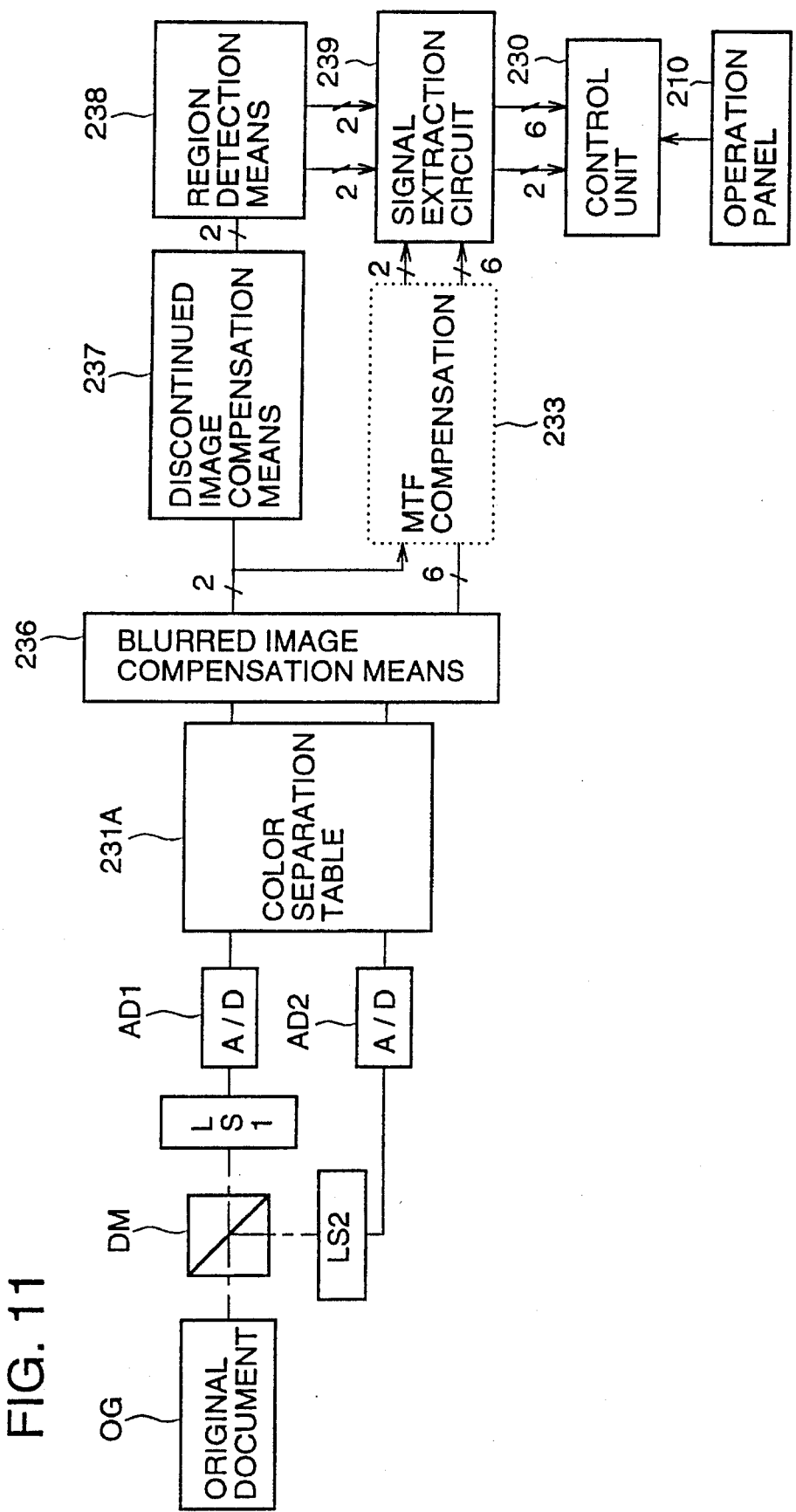
FIG. 11 is a block diagram showing an outline of the construction of the image processing section of an example of the image reproducing apparatus to accomplish the third object of the present invention.
Figure 12:
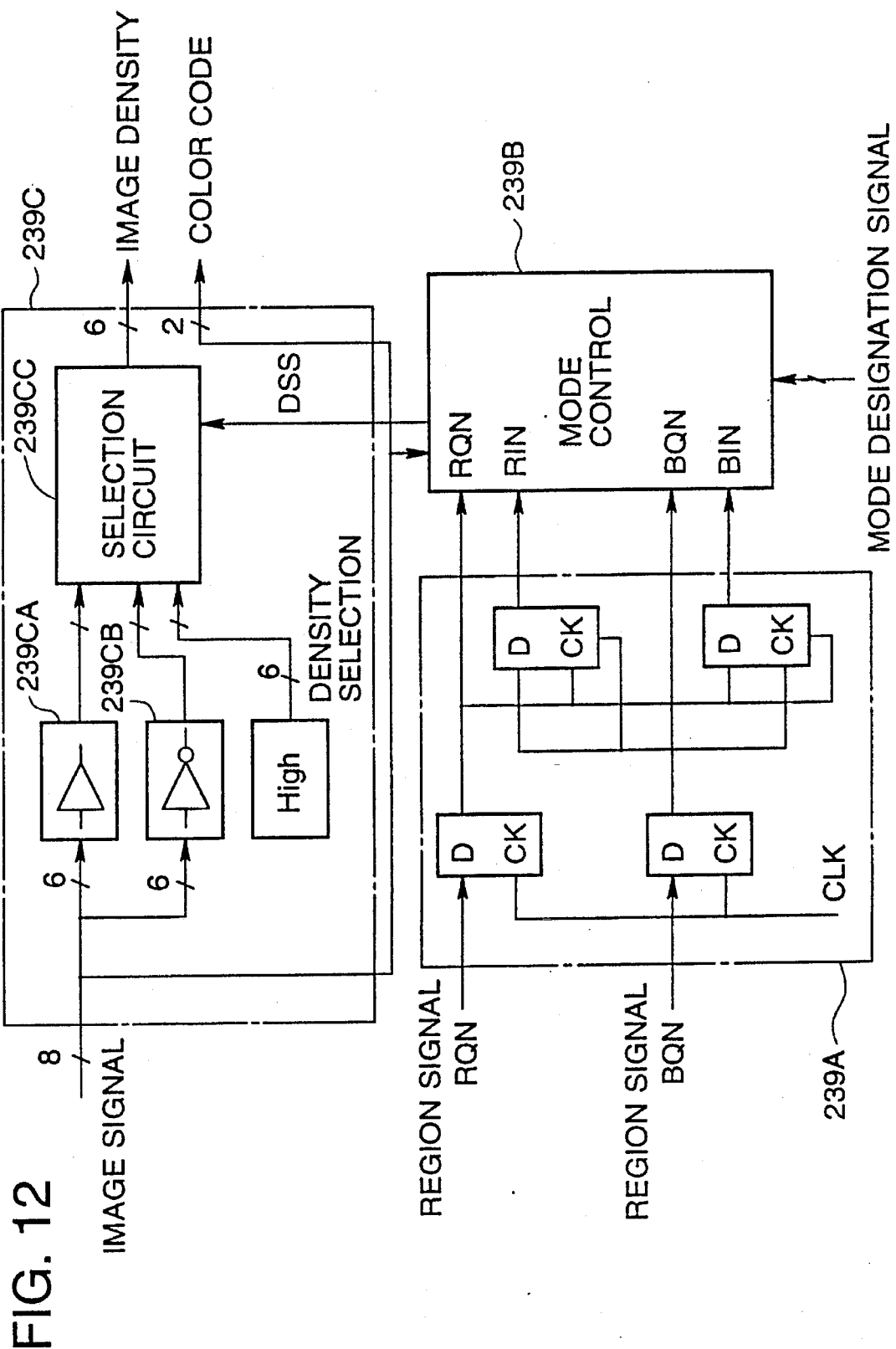
FIG. 12 is a block diagram showing an outline of the construction of the signal extraction circuit.

FIG. 11 is a block diagram showing an outline of the construction of an example of the image reproducing apparatus to accomplish the third object of the present invention . FIG. 12 is a block diagram showing an outline of the construction of the signal extraction circuit.

As illustrated in FIG. 11, the image reproducing apparatus 200 of this example includes the image reading section AA by which the document OG placed on the platen 201 is subjected to color separation so that the image is digitally read out. By a digital signal sent out from the image reading section AA, the color is separated to the recording color, and the color image is reproduced. The image reproducing apparatus 200 of the present invention includes the first counter CNT1, the second counter CNT2, and the comparing means CMP. In this case, the first counter CNT1 stores the specific color region data showing a color region corresponding to the color of the specific mark attached to the specific document, and also stores the specific mark frequency data showing the sampling data number composing the specific mark attached to the specific document. The second counter CNT2 counts the total frequency of the sampled digital image data in the specific color region. The comparing means CMP compares the count value of the second counter CNT2 with the specific frequency data. When the image reproducing apparatus 200 of the present invention includes the first counter CNT1, the second counter CNT2, and the comparing means CMP as described above, the specific mark is specified in the color region in the color separation map shown in FIG. 13, and in the dot number composing the specific mark. In this case, the second counter CNT2 may count the sampling dot number except for the outer frame of the specific mark, or alternatively, the second counter CNT2 may count the sampling dot number including the outer frame of the specific mark. A blurred image detecting means 236 detects a blurred image on the outer frame composing the specific mark, and a discontinued image compensation means 237 compensates at least one of the primary scanning and the subsidiary scanning in accordance with the output signal sent from the blurred image detecting means 236. Due to the aforementioned blurred image detection means 236 and the discontinued image compensation means 237, the optical accuracy of the image reproducing apparatus can be prevented from being deteriorated, and the specific mark can be recognized more efficiently even in the case of misoperation.

Construction of the image reading means AA has already been explained with reference to FIGS. 5 and 15. Therefore, the explanations will be omitted here. In this case, the document OG is placed on the platen glass PG. The cut-off frequency of the dichroic mirror DM is about 540 nm. Due to the foregoing, a red component is transmitted and a cyan component is reflected. In accordance with the intensity of received light, the line sensors LS1 and LS2 outputs the electric currents $I_R$ and $I_C$.

The image processing section BB is newly constructed as described before. The image processing section BB includes a blurred image compensation image 236, discontinued image compensation means 237, and region detecting means 238. The blurred image compensation image 236 is connected with a signal extraction means 239 through an MTF compensation means 233.

The color separation table 231A is provided with a high speed ROM, and as illustrated in the color separation map shown in FIG. 10, predetermined data is written in the color separation table 231A. Specifically, color signal data of 8 bits relating to the recording color corresponding to the digital image signals $V_r$ and $V_c$ of 6 bits is written on the color separation table 231A. In this case, the digital image signal $V_r$ of 6 bits shows the density level of a red component, and the digital image signal $V_c$ of 6 bits shows the density level of a cyan component. In this case, the color signal data relating to the recording color composing the color separation table 231A includes: color code data of 2 bits for designating the developer color; specific code data of 1 bit showing the specific color; and density data of 5 bits for determining the density of the recording color. Consequently, the color separation table 231A outputs the data of the recording color in the form of a color signal.

In this connection, the color separation table 231A is exclusively used for pre-scanning. In this example, a color separation table exclusively used for image formation is provided, the detailed explanation of which will be omitted here.

The specific code data is defined as code data expressing the wave length component of the background color on the specific document or expressing the wave length component of light reflected by the color of a specific mark attached on the specific document. In this case, the specific mark is composed of a character or a symbol, and an outer frame. Any mark may be used for the specific mark as long as it can be discriminated to be red or blue on the color separation map. The number of bits of the specific mark corresponds to LMB in the color code data.

The color code is determined by the specification. For example, the color code is shown in Table 4.

TABLE 4

| Color | Color Code | |
|---|---|---|
| | Specific | Code |
| Black | 0 | 00 |
| Blue | 0 | 01 |
| Red | 0 | 10 |
| Red | 1 | 10 |
| White | 0 | 11 |

According to the color separation map shown in FIG. 10, the specific color region is provided in the red region. Therefore, the color code is "110". However, the specific color region is not limited to this specific example. The specific region can be set in any regions on the color separation map shown in FIG. 10. Further, a plurality of regions can be set by the setting means 232 shown in FIG. 9.

The density data can be expressed by the following expression.

(Density data) = $(V_r + V_c)/2$

As expressed by the above expression, the density data is found when the density level of the cyan component and that of the red component are averaged.

When the color separation table 231A is constructed in the manner described above, a color signal of 8 bits can be outputted which is composed of color code data and density data corresponding to the recording color determined by the digital image signals $V_r$ and $V_c$.

The blurred image compensation means 236 operates as follows. Color code data for compensating a blurred image is written in a high speed ROM, which will be referred to as a blurred image compensation ROM, hereinafter. A color region relating to the target pixel is determined by LMB in a color code data row corresponding to 7 pixels sent out from the color separation table 231a. An address in the memory region in the ROM is determined from the color code data row corresponding to the 6 residual pixels. In this way, data is corrected to the color code data stored in the address. Specifically, the blurred image compensation means 236 operates in such a manner that white is corrected to the frame color when the number of white pixels surrounded by the frame color is not more than 3. Using the blurred image compensation patterns for 1 to 3 dots shown in FIGS. 8 to 10, when the primary scanning and subsidiary scanning are coincident, white is corrected to the frame color, and the color signal is sent out to the discontinued image compensation means 237 and MTF compensation means 233. The compensation pattern may be changed over while the compensation pattern is also used for color ghost compensation. Since the color ghost compensation has been described before, the detailed explanation will be omitted here.

With reference to Tables 5 to 7, a relation between address and data in the blurred image compensation ROM will be explained as follows.

TABLE 5

| Number of dots of compensation | | S7 | S6 | S5 | S4 | S3 | S2 | S1 | Result of compensation | Address | Data |
|---|---|---|---|---|---|---|---|---|---|---|---|
| 1 dot | (1) | White/Blue | Blue | Blue | White | Blue | Blue | Blue | Blue | 5D5 | DD |
| | (2) | White/Blue | Blue | Blue | White | Blue | Blue | Blue | Blue | 5D7 | DD |
| | (3) | White/Blue | Blue | Blue | White | Blue | White | Blue | Blue | 5DD | DD |
| | (4) | White/Blue | Blue | Blue | White | Blue | White | White | Blue | 5DF | DD |
| | (5) | White/Blue | White | Blue | White | Blue | Blue | Blue | Blue | DD5 | DD |
| | (6) | White/Blue | White | Blue | White | Blue | Blue | Blue | Blue | DD7 | DD |
| | (7) | White/Blue | White | Blue | White | Blue | White | White | Blue | DDD | DD |
| | (8) | White/Blue | White | Blue | White | Blue | White | White | Blue | DDF | DD |
| 1 dot | (9) | White/Red | Red | Red | White | Red | Red | Red | Red | AEA | FA |
| | (10) | White/Red | Red | Red | White | Red | Red | Red | Red | AEB | FA |
| | (11) | White/Red | Red | Red | White | Red | White | Red | Red | AEE | FA |
| | (12) | White/Red | Red | Red | White | Red | White | White | Red | AEF | FA |
| | (13) | White/Red | White | Red | White | Red | Red | Red | Red | EEA | FA |
| | (14) | White/Red | White | Red | White | Red | Red | Red | Red | EEB | FA |
| | (15) | White/Red | White | Red | White | Red | White | White | Red | EEE | FA |
| | (16) | White/Red | White | Red | White | Red | White | White | Red | EEF | FA |

TABLE 6

| Number of dots of compensation | | S7 | S6 | S5 | S4 | S3 | S2 | S1 | Result of compensation | Address | Data |
|---|---|---|---|---|---|---|---|---|---|---|---|
| 2 dot | (1) | White/Blue | Blue | Blue | White | White | Blue | Blue | Blue | 5F5 | DD |
| | (2) | White/Blue | Blue | Blue | White | White | Blue | White | Blue | 5F7 | DD |
| | (3) | White/Blue | White | Blue | White | White | Blue | Blue | Blue | DF5 | DD |
| | (4) | White/Blue | White | Blue | White | White | Blue | White | Blue | DF7 | DD |
| | (5) | White/Blue | Blue | White | White | Blue | Blue | Blue | Blue | 7D5 | DD |
| | (6) | White/Blue | Blue | White | White | Blue | Blue | White | Blue | 7D7 | DD |
| | (7) | White/Blue | Blue | White | White | Blue | White | Blue | Blue | 7DD | DD |
| | (8) | White/Blue | Blue | White | White | Blue | White | White | Blue | 7DF | DD |
| 3 dot | (1) | White/Blue | Blue | Blue | White | White | White | Blue | Blue | 5FD | DD |
| | (2) | White/Blue | White | Blue | White | White | White | Blue | Blue | DFD | DD |
| | (3) | White/Blue | Blue | White | White | White | Blue | Blue | Blue | 7F5 | DD |
| | (4) | White/Blue | Blue | White | White | White | Blue | White | Blue | 7F7 | DD |
| | (5) | Blue | White | White | White | Blue | Blue | Blue | Blue | FD5 | DF |
| | (6) | Blue | White | White | White | Blue | Blue | White | Blue | FD7 | DF |
| | (7) | Blue | White | White | White | Blue | White | Blue | Blue | FDD | DF |
| | (8) | Blue | White | White | White | Blue | White | White | Blue | FDF | DF |

In this example, it is possible to write a look-up table corresponding to the all color region on a single ROM, however, consideration is given to the convenience of correction conducted later, and a look-up table for each color is written in an independent memory region, for example, in an individual ROM. In this case, data S7 is data used for directing a color region or a ROM corresponding to the color region. For example, white/blue may show a white region or a ROM in which the white region is written, or it may show a blue region or a ROM in which the blue region is written.

In Tables 5 and 6, data of the look-up table includes: color code data rows S1 to S6 corresponding to the address data in the memory region of the ROM; and color code data for correcting the color code of the target pixel. For example, in a table corresponding to the dot number 1 of correction, data S4 is color code data corresponding to the target pixel. Data S1 to S3, S5 and S6 are color code data corresponding to the peripheral pixel.

The dot number of correction shows the number of dots, the color codes of which acre to be corrected.

TABLE 7

| Number of dots of compensation | | S7 | S6 | S5 | S4 | S3 | S2 | S1 | Result of compensation | Address | Data |
|---|---|---|---|---|---|---|---|---|---|---|---|
| 1 dot | (1) | White/Blue | Blue | White | Blue | White | Blue | Blue | Blue | 775 | DD |
| | (2) | White/Blue | Blue | White | Blue | White | Blue | White | Blue | 777 | DD |
| | (3) | White/Blue | Blue | White | Blue | White | White | Blue | Blue | 77D | DD |
| | (4) | White/Blue | Blue | White | Blue | White | White | White | Blue | 77F | DD |
| 1 dot | (5) | White/Red | Red | White | Red | White | Red | Red | Red | BBA | FA |
| | (6) | White/Red | Red | White | Red | White | Red | White | Red | BBB | FA |
| | (7) | White/Red | Red | White | Red | White | White | Red | Red | BBE | FA |
| | (8) | White/Red | Red | White | Red | White | White | White | Red | BBF | FA |

Table 7 is approximately the same as Tables 5 and 6. A compensation pattern for compensating bug is shown in Table 7.

TABLE 8

Pattern for compensating 1 dot
Target pixel

| White/Red | White/Red | Red | White | Red | White/Red | White/Red |
|---|---|---|---|---|---|---|

TABLE 9

Pattern for compensating 2 dots
Target pixel

| White/Red | White/Red | Red | White | White | Red | White/Red |
|---|---|---|---|---|---|---|
| White/Red | Red | White | White | Red | White/Red | White/Red |

TABLE 10

Pattern for compensating 3 dots
Target pixel

| White/Red | White/Red | Red | White | White | White | Red |
|---|---|---|---|---|---|---|
| White/Red | Red | White | White | White | Red | White/Red |
| Red | White | White | White | Red | White/Red | White/Red |

The discontinued image compensation means 237 recognizes the time at which the frame line crosses the character, and then conducts compensation processing. In the case where the frame line width is not less than 5 dots, specifically, when the same discontinued image compensation pattern shown in Table 11 is coincident with respect to the primary scanning and the subsidiary scanning, the line and character coming into contact with the frame line are compensated in the primary and subsidiary directions by 0.5 mm.

TABLE 11

| 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| B | R | R | R | R | R | x | x | x | x | x | x | x | x | x |
| B | B | R | R | R | R | R | x | x | x | x | x | x | x | x |
| B | B | B | R | R | R | R | R | x | x | x | x | x | x | x |
| B | B | B | B | R | R | R | R | x | x | x | x | x | x | x |
| B | B | B | B | B | R | R | R | R | x | x | x | x | x | x |
| B | B | B | B | B | B | R | R | R | R | x | x | x | x | x |
| B | B | B | B | B | B | B | R | R | R | R | x | x | x | x |
| B | B | B | B | B | B | B | B | R | R | R | R | x | x | x |
| R | | | | | | | | | | | | | | |

B: Black R: Red

Table 11 shows the rows of dots in the primary or subsidiary scanning direction. The size of 8 dots corresponds to the length of 0.5 mm on a document. Character x in Table 11 shows that there is no color code data, or alternatively it shows dummy data. In Table 11, numerals 1 to 15 are discrimination numbers of the discontinued image compensation patterns. The discrimination numbers 9 to 13 express the color codes corresponding to the size of the frame line that can not be corrected. The discrimination numbers 1 to 8 express the color codes corresponding to the size of the frame line that can be corrected.

The region detection means 238 reads a detecting portion of the frame line as "1" and also reads other portions as "0", so that the region on the present line is determined. A region corresponding to the first rise and the last transition of the reading information having a common portion with respect to the region on all line, is "1" and other regions are "0". In this way, a converting region signal of the region signal and the reading information is sent out to the signal extraction circuit 239. This processing is repeated for each line at real time.

As illustrated in FIG. 12, the signal extraction circuit 239 includes a frame line inside and outside detection circuit 239A, mode control 239B and density data detecting circuit 239C. The signal extraction circuit 239 extracts the density data of pixels designated as a color region signal and a processing mode signal.

The frame line inside and outside detecting circuit 239A judges the region signals RQN and BQN sent out from the region detecting means 238, and detects whether a dot is inside or outside of the frame line. For example, it is indicated by the frame line inside and outside detecting circuit 239A whether an image signal sent out from the MTF compensation means 233 is inside or outside of the frame line composing the specific mark.

The mode control 239B is directed by the operation panel 210, and the pixel selecting signal DSS is sent out from the mode control 239B. In this case, the pixel selecting signal DSS directs whether the pixel is extracted from the inside of the frame line or the pixel is extracted from the outside of the frame line, wherein the direction is given by the mode signal for designating a marker mode, reversal mode or normal mode, and also the direction is given by the output signal sent out from the frame line inside and outside detecting circuit 239A.

The density data detecting circuit 239C sends out the density signal and color code signal of the pixel selected in accordance with the image selecting signal DSS to the control section 230. For example, a color code of the image signal sent out from the MTF compensation means 233 is outputted to the mode control 239B and control section 230, and a density signal is inputted into the selection circuit 239CC through the buffers 239CA and 239CB. The selection circuit 239CC selectively sends out the density data to the control section 230 in accordance with the pixel selecting signal DSS.

While consideration is given to the real time processing conducted in the hardware in this example, the MTF compensation means 233 uses a convolution filter, the size of which is 3×3. In this case, convolution is described as follows. Image data and a digital-matrix-like convolution filter are mutually correlated, so that the same component as the arrangement of values in the matrix is extracted from the image data. An example of the convolution filter of 3×3 will be explained as follows with reference to Tables 12 and 13.

TABLE 12

Character Type Document

| 0 | −1 | 0 |
|---|---|---|
| −½ | 4 | −½ |
| 0 | −1 | 0 |

Table 12 shows an example of the convolution filter for use in a character type document.

TABLE 13

| Photograph Type Document | | |
| --- | --- | --- |
| 0 | −¼ | 0 |
| −¼ | 2 | −¼ |
| 0 | −⅓ | 0 |

Table 13 shows an example of the convolution filter for use in a photograph type document.

The control section 230 includes: specific color region data for showing a color region corresponding to the color of a specific mark attached to a document; a first counter CNT1 for storing specific mark frequency data showing the number of sampling data composing the specific mark attached to the document; a second counter CNT2 for counting the total frequency of digital image data in the specific color region of the digital image data; and a comparison means CMP for comparing a count value of the second counter CNT2 with the specific frequency data. When the aforementioned control section 230 is provided, the specific mark can be specified from the color region shown in the color separation map in FIG. 10, and also can be specified from the number of dots composing the specific mark. The second counter CNT2 may count the number of sampling dots of the specific mark except for the outer frame. The second counter CNT2 may count the number of sampling dots of the specific mark including the outer frame composing the specific mark. In this case, the specific color data includes a color code expressing the color region, and density data. The specific color data is data for specifying the color region shown in the color separation map in FIG. 10, from the density and color region.

With reference to FIGS. 7, 10 to 12, and 15, the pre-scanning operation of the image reproducing apparatus 200 of this example will be explained as follows.

First, the operator opens the platen cover PK and puts the document OG on the platen glass PG. Then the operator sets the number of copies using the operation panel 210, and presses the copy switch. As illustrated in FIG. 15, the control section 230 turns on the light source 202. Then the light source 202 is moved at a predetermined speed while the light source 202 illuminates the surface of the document OG with white light, the illuminated portion being formed rectangular. The control section 230 moves the V mirror section M22 at half the speed of the light source 202 in the same direction as that of the light source 202. Due to the foregoing, the document OG is scanned. A beam of light reflected on the surface of the document OG is reflected by the first, second and third mirrors 203, 204, 205. Then the beam of light is divided into a red and a cyan component by the action of the dichroic mirror DM. Then a red image is formed on the red line sensor LS1 by the image formation lens 206, and a cyan image is formed on the cyan line sensor LS2. The scanning conducted by the image reading section AA is the pre-scanning conducted before the image formation process.

A sampling range for discrimination processing is 100 mm in the primary scanning direction shown by hatched lines in FIG. 7, and 162 mm in the subsidiary scanning direction. For example, data is sampled for each 1 mm in the primary scanning direction and 0.25 mm in the subsidiary scanning direction. Accordingly, sampling data of 64800 points can be obtained. EE processing and APS processing are also carried out as the pre-scanning operation in this example, however, the detailed explanations will be omitted here.

Electric currents $I_R$ and $I_C$ outputted from the red and cyan line sensors LS1 and LS2 in the pre-scanning, are respectively subjected to shading compensation by the A/D converters AD1 and AD2. At the same time, the currents are subjected to the A/D conversion, so that the currents are converted into the digital image signals $V_r$ and $V_C$ of 6 bits, and then the image signals are sent to the color separation table 231A. The color separation table 231A sends a color signal of 8 bits corresponding to the digital image signal to the blurred image compensation means 236.

Data S7 is LMB in the color code data row corresponding to the 7 pixels sent out from the color separation table 231A. The blurred image compensation means 236 determines a color region relating to the target pixel by the data S7. The blurred image compensation means 236 selects the blurred image compensation ROM corresponding to the color region. Then the blurred image compensation means 236 compares a color code data row corresponding to the 6 residual pixels with the compensation patterns S1 to S6 shown in Table 5. In the case where the color code data row corresponding to the 6 pixels does not coincide with the compensation patterns S1 to S6 shown in Table 5, the blurred image compensation means 236 sends the color signal as it is, to the discontinued image compensation means 237 and the MTF compensation means 233. On the other hand, in the case where the color code data row corresponding to the 6 pixels coincides with the compensation patterns S1 to S6 shown in Table 5, the blurred image compensation means 236 determines the address in the memory region of the selected blurred image compensation ROM, and the data is corrected to the color code data showing the color code accommodated in the address. Specifically, the blurred image compensation means 236 corrects white to a frame line color in the case where white surrounded by the frame line color is not more than 3 pixels. Using the blurred image compensation patterns for 1 to 3 dots shown in Tables 8 to 10, when both primary scanning and subsidiary scanning are coincident, white is corrected to the frame line color, and the color signal is sent out to the discontinued image compensation means 237 and MTF compensation means 233. Due to the foregoing, as shown by the compensation result in Table 5, when the color code is corrected, the blurred image compensation can be carried out.

The discontinued image compensation means 237 detects whether or not the color code row in the color signal sent out from the blurred image compensation means 236 coincides with the same compensation pattern shown in Table 12 with respect to the primary and subsidiary scanning. In the case where they are coincident, under the condition that the width of the frame line is not less than 5 dots, the color code in the color signal corresponding to the target pixel is corrected to the frame line color, and the corrected color code is sent out to the region detecting means 238. Due to the foregoing operation, a line and character coming into contact with the frame line can be compensated in the directions of primary and subsidiary scanning by 0.5 mm.

In accordance with the color code sent out from the discontinued image compensation means 237, the region detecting means 238 reads a detected portion of the frame line color as "1" and the region detecting means 238 reads other portions of the frame line color as "0". In this way, a region at the present line is determined. A region corresponding to the first rise and the last transition of the reading information having a common portion with respect to the region on all line, is "1" and other regions are "0" In this way, a converting region signal of the region signal and the reading information is sent out to the signal extraction circuit 239. This processing is repeated for each line at real time.

In accordance with the mode designation signal sent from the operation panel 210, the MTF compensation means 233 uses the convolution filter of 3×3 for use in character type documents shown in Table 7 or for use in photograph type documents shown in Table 8, and extracts the same component as the value arrangement in the matrix, from the density data. An 8 bit color signal obtained in this way is sent to the signal extraction circuit 239.

The frame line inside and outside detecting circuit 239A judges the region signals RQN and BQN sent out from the region detecting means 238, and detects whether a color signal sent out from the MTF compensation means 233 is inside or outside of the frame line composing the specific mark. Then an inside and outside signal indicating whether the color signal sent out from the MTF compensation means 233 is inside or outside of the frame line, is sent to the mode control 239B.

In accordance with the mode signal and the inside and outside signal directed through the operation panel 210 shown in FIG. 11, the mode control 239B sends the pixel selection signal DSS to the density data detecting circuit 239C, wherein the pixel selection signal DSS designates whether the pixel is extracted from the inside of the frame line or the outside of the frame line.

The density data detecting circuit 239C sends the density data signal and color code signal of the pixel selected in accordance with the image selection signal DSS, to the control section 230. For example, the color code of the image signal sent out from the MTF compensation means 233 is outputted into the mode control 239B and control section 230, and the density data signal is inputted into the selection circuit 239CC through the buffers 239CA and 239CB. The selection circuit 239CC selectively sends the density data to the control section 230 in accordance with the pixel selection signal DSS. In the case where the pixel selection signal DSS designates the inside of the frame line, a color signal inside the frame line composing the specific mark is extracted from the color separation table 231B and sent to the control section 230. In the case where the image selection signal does not designate either the inside or the outside of the frame line, the signal extraction circuit 239 does not extract a color signal and sends the signal as it is. For the convenience of explanation, this color signal is referred to as a non-extraction color signal.

The control section 230 compares the non-extraction color signal sent out from the density data detecting circuit 239C, with the specific color region data. In the case where they are not coincident with each other, the control section 230 does not increase the first counter CNT1. In the case where they are coincident with each other, the control section 230 increases the first counter CNT1. Due to the foregoing, specific mark frequency data showing the number of sampling data composing the specific mark attached to the specific document, can be stored in the first counter CNT1.

The control section 230 compares an extraction color signal sent out from the density data detecting circuit 230C with the specific color region data. Only when they are coincident with each other, the second counter CNT2 is increased. Due to the foregoing, the frequency of dots composing the character or sign except for the frame line composing the specific mark, is stored in the second counter CNT2.

By the control of the control section 230, the comparing means CMP compares the count value stored in the second counter CNT2 with the specific frequency data. ,When they are coincident, it can be recognized that the document OG is the specific document. In this way, by the control of the control section 230, the document OG and the specific document can be discriminated by the color region in the color discrimination map in FIG. 13 and the number of dots composing the specific mark. In the case where they are not coincident in the comparing operation described above, it is Judged that the document OG is not the specific document.

In this example, the second counter CNT2 increases the number of sampling dots of the specific mark except for the outer frame, however, the present invention is not limited to the specific example. The number of sampling dots may be increased including the frame line composing the specific mark.

As described above, the image reproducing apparatus 200 of this example only has the specific color region data in the color separation map shown in FIG. 10, and the number of dots composing the specific mark, as data for discriminating the specific document. Accordingly, the deterioration of copying function can be prevented although a large number of specific documents are registered. Further, the image reproducing apparatus 200 of this example includes the blurred image compensation means 236 and discontinued image compensation means 237. Therefore, an image reproducing apparatus can be provided, by which the specific document can be positively prevented from being copied without being affected by a blurred specific mark caused by the deterioration of the MTF characteristics.

In the image reproducing apparatus 200 of this example, ghost compensation is not conducted. However, when ghost compensation is also carried out, the specific document can be positively discriminated without being affected by the following factors.

(1) Slippage of pixels caused between CCDs originated from the mounting accuracy of the CCDs, deformation of the CCDs, and a change in the CCDs caused by lapse of time (2) Disagreement of the magnification of red, blue and MTF.

(3) Color ghost originated from the output level difference between red and blue caused by chromatic aberration of the lens With reference to FIG. 7 and FIGS. 13 to 15, an example of the image reproducing apparatus to accomplish the fourth object of the present invention will be explained as follows.

As illustrated in FIG. 15, what is called a KNC process type digital system is adopted in the image reproducing apparatus 200 of this example, and the image reproducing apparatus 200 comprises: a platen 201 made of platen glass (referred to as platen glass PG in this example hereinafter); a light source 202 for illuminating a document OG placed on the platen 201 with a beam of white light; a first mirror 203 mounted on a moving member M1 having the light source 202, wherein the first mirror 203 reflects a beam of light sent from the document OG; a V mirror unit M22 including a second mirror 204 and third mirror 205 which reflect the beam of light sent from the first mirror 203; and an image formation lens 206 through which an image is formed on a line sensor LS1 for red and a line sensor LS2 for cyan through a dichroic mirror (shown by DM in FIG. 5). These units compose an image reading section AA. The image reproducing apparatus 200 also comprises: an image processing section BB in which a digital image signal sent from the image reading section AA is converted into a color signal corresponding to a recording color; a writing section CC which emits a laser beam in accordance with a recording signal and conducts scanning on the image forming body 220 for each dot; an image formation processing section DD including a scorotron charger 221, developing units 222Y, 222M, 222C, 222BK, transfer unit 2223, separating unit 2224, and cleaning unit 225, wherein electrostatic photographic processing is carried out in the image formation processing section DD; and a sheet feeding system EE which feeds recording sheets P to the transfer and separation sections. When the electrostatic photographing processing is carried out in the above apparatus, a color image of the document is reproduced on the recording sheet P.

In this case, the image forming body 220 is a drum, the diameter of which is approximately 100 mm. In the image forming body 220, an OPC photosensitive layer is formed in an aluminum base.

As a new construction, the image reproducing apparatus 200 includes: a color separation table 231A composing the first judging means which outputs a signal for judging the coincidence with the original (the first generation) of the specific document; and a color separation table 231B composing the second judging means which judges an indication color for indicating the second generation, wherein the indication color is written when the second generation copy has been made from the specific document. This image reproducing apparatus 200 includes: a control section 230 composing a warning and prohibiting means, wherein the warning and prohibiting means gives warning in accordance with an output signal sent from the color separation table 231A or 231B, and also the warning and prohibiting means prohibits the copying operation, the generation of which exceeds a predetermined one; and a control panel 210 composing a releasing means for releasing the warning indication or the prohibition of generation copy.

In this example, it is supposed that recording sheets having a specific background color such as red are used for the original of the specific document and that a specific mark such as a letter and mark is written in the original. In this case, when the first judging means is used, it is judged whether or not a document to be reproduced is the original of the specific document (the first generation document). In enterprises, the specific document is allowed to be copied only once so that the copies can be distributed to the departments concerned. In this case, the copying operation of the second generation is not allowed, and it is necessary that the prohibition of generation copy can not be withdrawn by any methods such as a control key or ID card. In this example, when the second judging means is used, it is Judged whether or not a document to be reproduced is the copy of the second generation of the specific document.

Specifically, when a specific color code signal sent from the color separation table 231A composing the first Judging means, is "1" it can be judged that the document is the original of the specific document. Therefore, the image reproducing apparatus 200 gives warning once. However, when the control key or ID is used, the prohibition can be withdrawn, so that the second generation copying operation can be executed using a release switch.

Figure 16:
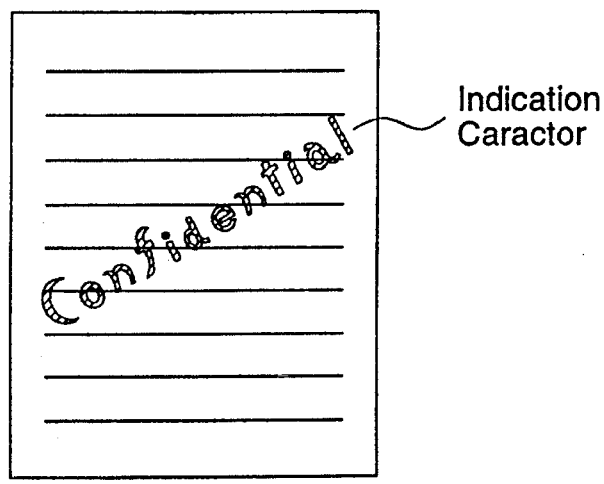
FIG. 16 is an illustration showing an embodiment of indication characters indicating the second generation of the specific document.

In the case where the second generation copy is made, it is checked by various methods that the copy is of the second generation, and the copy of the following generation is positively prohibited. In an embodiment of the present invention, as illustrated in FIG. 16, using a developing unit such as a developing unit 222Y, 222M or 222C which is not a black developing unit, a row of indication characters expressing the second generation are written in addition to the document image to be copied. For example, the row of indication characters "Confidential" are printed in yellow on the background so that the second generation copy is expressed while the document image can be clearly recognized.

In the manner described above, on the background of the specific document of the second generation, a row of indication characters peculiar to the second generation are printed. Therefore, when the following generation document is made from the second generation document, the row of indication characters are detected by the second judging means described above, and they are judged to be the second generation of the specific document, so that the copying operation is prohibited. Specifically, when the specific color code signal sent from the color separation table 231B composing the second judging means, is "1" it is Judged that the document is of the second generation copy of the specific document.

Figure 17:
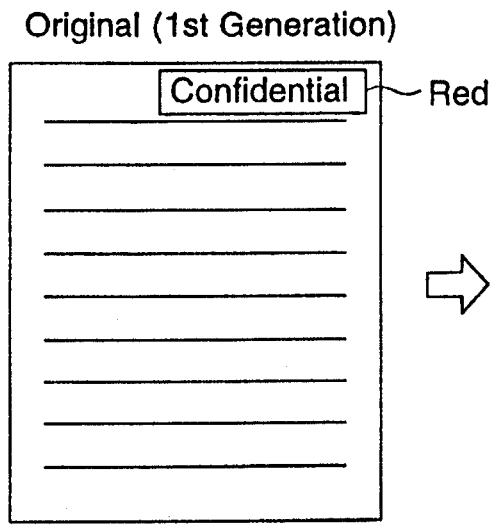
FIG. 17(A) and 17(B) are illustrations showing an embodiment of discrimination method to discriminate between the first generation document and the second generation copy of the first generation document by means of a specific mark.
Figure 17:
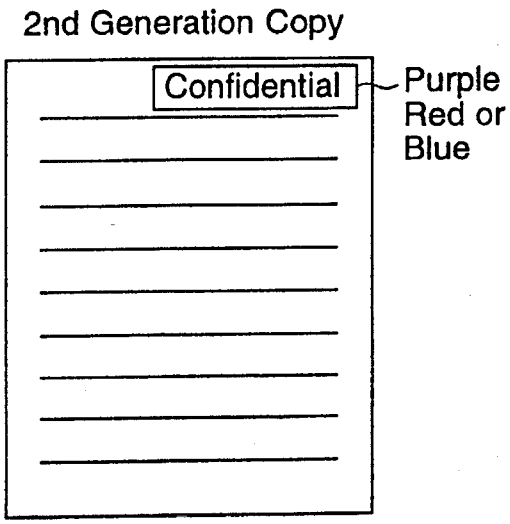

Concerning the method for judging the specific document of the first generation, the following two methods may be adopted:

One is a method shown in another example of the present invention, in which the specific document is recognized using a sheet of paper, the background color of which is specific. The other method is shown in FIGS. 17(A) and 17(B), in which the specific document is recognized by the existence of a specific mark. In the method in which the specific document is recognized by the specific mark, in the case of a color image reproducing apparatus, the second generation copy including the specific mark can be made irrespective of the color of the specific mark. Accordingly, in this case, the second generation copy can be recognized by the row of characters as described above, however, when the color of the specific mark is changed, the second generation copy can be recognized.

For example, in the case of an original of the specific document on which the specific mark is recorded as a red stamp as illustrated in FIG. 17(A), color processing is executed, and the specific mark is changed into a color slightly different from the original red, such as purple red, or a color completely different from the original red, such as blue, as illustrated in FIG. 17(B). In this way, the color, changed into a different color, is recorded on the second generation copy. In this case, it is not necessary to write a row of indication characters expressing the second generation copy, and only the first judging means is used for discriminating between the original of the specific document and the second generation copy. Therefore, it is possible to omit the second Judging means.

In the case where the original of the specific document and the second generation copy are discriminated by the background color and the row of indication characters, the first Judging means discriminates the background color, and the second judging means discriminates the row of indication characters. Concerning the discriminating method between the original and the second generation copy, two sets of combinations are provided. One is a case in which the background color is used for the discrimination of the original, and the row of indication characters are used for the discrimination of the second generation copy. The other is a case in which the row of indication characters are used for the discrimination of the original, and the background color is used for the discrimination of the second generation copy.

The specific construction will be explained as follows.

Figure 14:
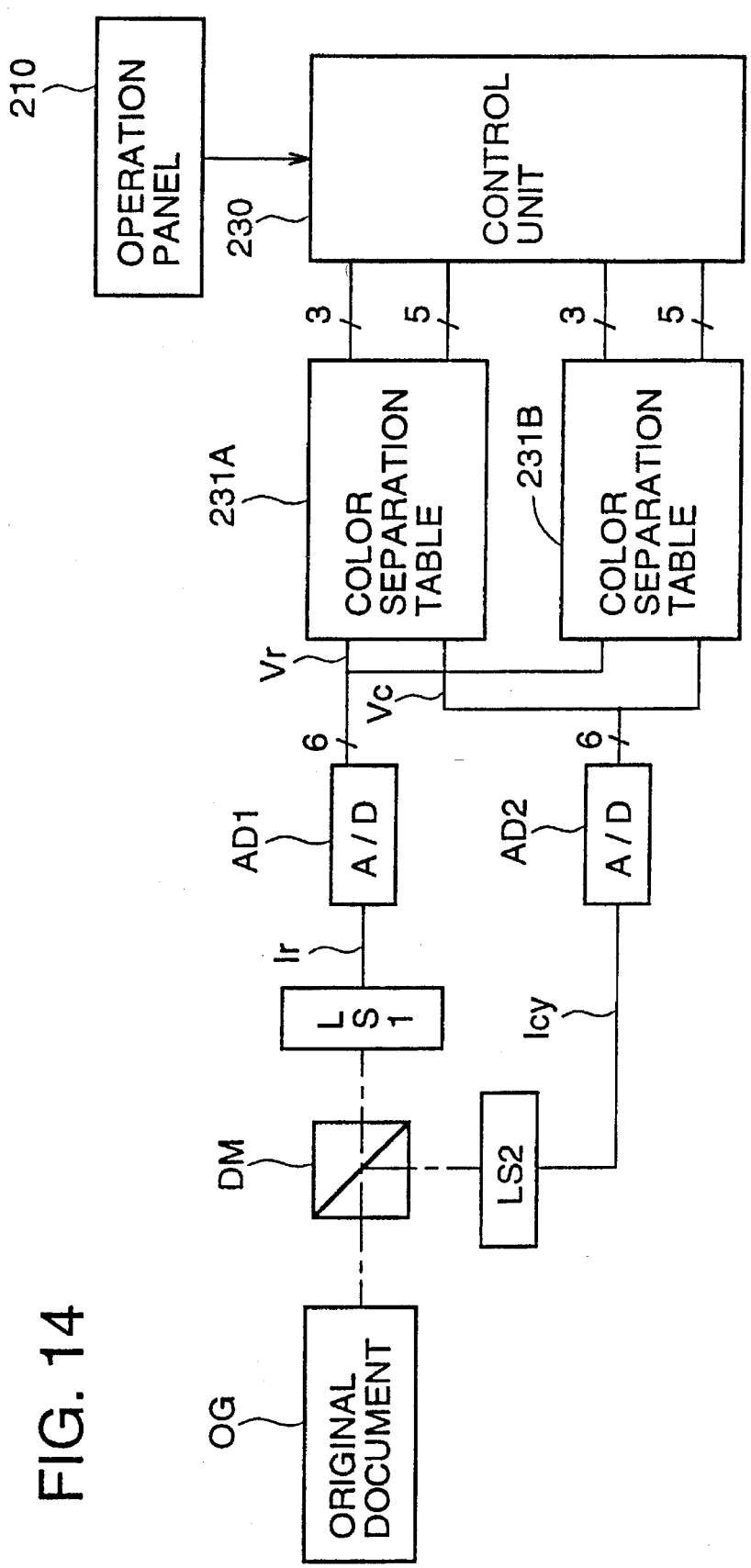
FIG. 14 is a block diagram showing the essential construction of an example of the image reproducing apparatus to accomplish the fourth object of the present invention.

In FIG. 14, the document OG is placed on the platen glass PG. Light reflected by the document OG is projected to the dichroic mirror DM composing the optical image reading system. Then the light is subjected to spectral processing by the dichroic mirror so as to be separated to red and cyan images. After that, the images are respectively formed on the line sensors LS1 and LS2. In this case, the cutoff wave length of the dichroic mirror DM is about 540 nm. Due to the foregoing, the red component is transmitted and the cyan component is reflected. The line sensors LS1 and LS2 respectively output currents $I_R$ and $I_C$ in accordance with the light intensity. These line sensors LS1 and LS2 are included in the image reading section AA. These currents $I_R$ and $I_C$ are subjected to shading-compensation by the A/D converters AD1 and AD2. At the same time, these currents $I_R$ and $I_C$ are A/D-converted into digital image signals $V_r$ and $V_c$ of 6 bits, and sent to the color separation tables 231A, 231B. The digital signal $V_r$ shows a density level of the red component, and the digital signal $V_c$ shows a density level of the cyan component of the document image.

Figure 13:
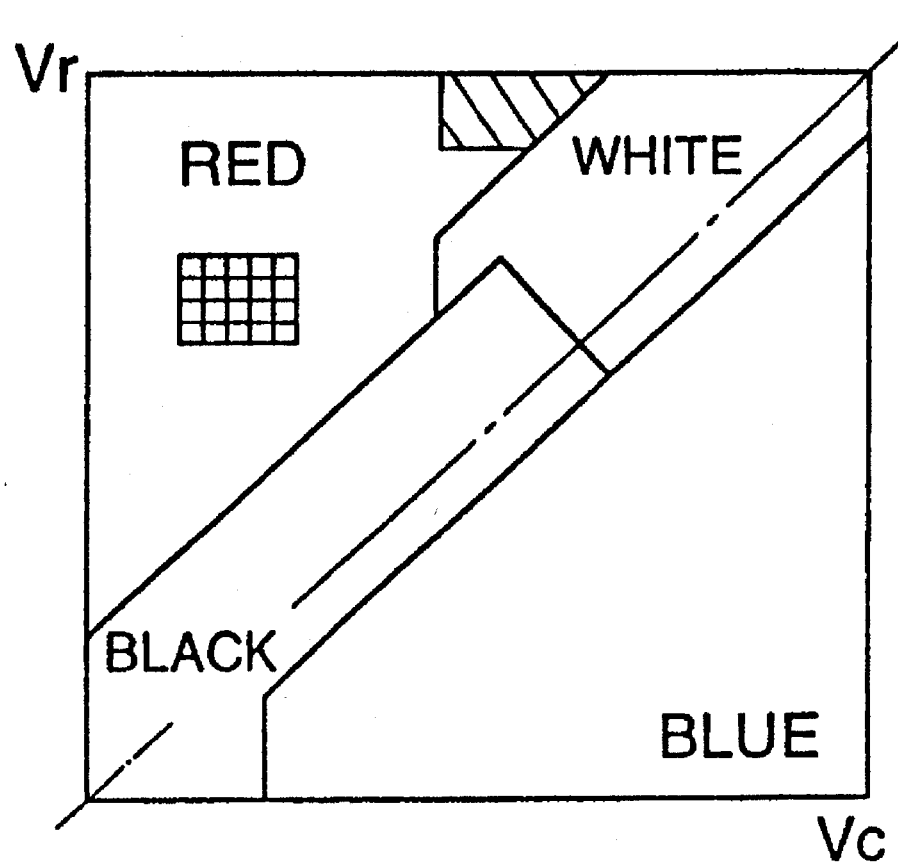
FIG. 13 is a conceptional view of the color separation map employed in the image reproducing apparatus to accomplish the third and fourth objects of the present invention.

A high speed ROM is used for the color separation tables 231A, 231B, and predetermined data is previously written in the color separation table 231 as shown in FIG. 13. Specifically, 8 bit data is written in the color separation table, wherein the 8 bit data relates to the recording color corresponding to the 6 bit digital image signal $V_r$ showing the density level of the red component, and also corresponding to the 6 bit digital image signal $V_c$ showing the density level of the cyan component. In this case, the data relating to the recording color composing the color separation tables 231A, 23B is, for example, the 3 bit color code data for designating the color of developer, and the 5 bit density data for determining the density of the recording color. Consequently, the color separation tables 231A, 231B output the data relating to the recording color in the form of a color signal.

Since the color separation tables 231A, 231B are constructed in the manner described above, a color signal of 8 bits can be outputted, wherein the color signal is composed of color code and density data of the recording color corresponding to the digital image signals $V_r$ and $V_c$.

The reason why the color separation tables 231A and 231B are separately provided is related to the number of bits composing a color signal. As described in FIG. 13, the specific color region in this example is determined by the color and density. Consequently, in the case where a plurality of specific color regions are provided in the same color region in the color separation map shown in FIG. 13, the bit number of specific color codes described later must be increased. However, in this example, it is impossible to provide the specific color code, the bit number of which is not less than one. In this example, a plurality of specific color regions are provided in the same color region in the color separation map. Therefore, in order to discriminate the specific color regions, the color separation tables 231A and 231B are separately provided. In this connection, if the bit number of the specific color code can be increased, of course, a single color separation table can be adopted. When the specific color code is made to be a signal independent from the color signal, the single color separation table can be adopted for the construction.

The color codes are determined by the specification. For example, the color codes are shown on Table 4.

According to the color separation map shown in FIG. 13, the first and second specific color regions are provided in the red region. Therefore, the color code is "110". However, the present invention is not limited to the specific example, and the specific region can be set in either region in the color separation map shown in FIG. 13. Further, a plurality of regions can be set by the setting means 232 shown in FIG. 9.

The density data can be expressed by the following expression.

$$(\text{Density Data}) = (V_r + V_C)/2$$

As expressed above, the density data is obtained when the density level of the cyan component and that of the red component are averaged.

Since the color separation tables 231A and 231B are constructed in the manner described above, a color signal of 8 bits can be outputted, wherein the color signal is composed of color code and density data of the recording color corresponding to the digital image signals $V_r$ and $V_c$.

Specifically, the color separation tables 231A and 231B are exclusively used for pre-scanning. In this example, a color separation table exclusively used for the image formation process is separately provided, which will not be described here.

In this example, the image processing section BB includes A/D converters AD1, AD2 and color separation tables 231A, 231B.

The control section 230 compares a color code signal of 3 bits sent out from the color separation table 231A, with the first setting color code data "110" corresponding to the background color of the specific document, wherein the first setting color code data "110" is previously set. In the case of the construction in which the original is discriminated by the background color, it is discriminated that the document OG to be copied is the original of the specific document. In the case of the construction in which the second generation copy is discriminated by the background color, it is discriminated that the document OG is the second generation copy of the specific document.

The control section 230 compares a color code signal of 3 bits sent out from the color separation table 231B, with the first setting color code data "110" corresponding to the row of indication characters of the specific document, wherein the first setting color code data "110" is previously set. In the case of the construction in which the original is discriminated by the row of indication characters, it is discriminated that the document OG to be copied is the original of the specific document. In the case of the construction in which the second generation copy is discriminated by the row of indication characters, it is discriminated that the document OG is the second generation copy of the specific document.

In this case, the first specific document prohibition mode operates as follows. In accordance with the color code signal "110" sent out from the color separation table 231A, the image formation process following the pre-scanning operation is stopped in the mode. That is, the control section 230 determines whether the image forming process following the pre-scanning operation is continued or not, wherein the determination is conducted by the existence of a release signal obtained when the release switch on the operation panel 210 is pressed.

The control section 230 judges whether the specific document of the generation is to be copied or not, by the existence of the release signal. On the other hand, even when the control section 230 has received a release signal, a display of "warning" is made on the display panel provided on the operation panel 210. Sometimes, instead of the display of "warning", a display is made which shows that the specific document is subjected to the generation copying operation. Consequently, the control section 230 corresponds to the warning and prohibition means.

In the case where the original of the specific document is to be copied, the control section 230 receives the withdrawal of prohibition of copying operation by means such as a control key or ID card shown in another example, and when the withdrawal switch provided on the operation panel 210 is pressed so as to receive the withdrawal signal, the prohibition of copying operation can be withdrawn. However, in the case where the second generation copy of the specific document is to be copied, the withdrawal of prohibition of copying operation conducted by means such as the control key or ID card, is not received.

In the case where the original of the specific document is copied, the row of indication characters expressing the second generation are written in addition to the document image to be copied on a sheet of recording paper, by a developing unit such as a developing unit 222Y, 222M or 222C which is not a black developing unit. Due to the foregoing, in the case where the second generation is further copied, the withdrawal of prohibition of copying operation is not received. When this technique is applied, the generation copy can be prohibited not only at the second generation but also at any designated generation.

The control section 230 is provided with a function for storing a character composing the specific mark attached to the specific document, wherein the character is stored in the manner of a halftone dot. By this function, dot data is stored so that the specific mark read by the image reading section AA or the specific mark previously registered is reproduced in the manner of a rough halftone dot.

By the information of the specific mark stored in this memory, the control section 200 recognizes the specific mark. Therefore, this recognition system is used for an embodiment in which the specific document is recognized by the existence of the specific mark.

The operation panel 210 is provided with a liquid crystal display for displaying a warning sign, and also provided with a release switch for releasing the prohibition condition of image forming operation. The operation panel 210 corresponds to the release means, and a mode selection switch is provided for selecting between the first and second specific document prohibition modes.

When a signal is inputted into the control section 230 from the operation panel 210, the control section 230 controls the image reading section AA, image processing section BB, writing section CC, image forming process section DD, and sheet supply system EE, so that the image forming process can be carried out.

With reference to FIG. 7 and FIGS. 13 to 15, the pre-scanning operation conducted in the image reproducing apparatus 200 of this example will be explained as follows.

First, the pre-scanning operation in the first specific document prohibition mode will be described.

First, the operator opens the platen cover PK and puts the document OG on the platen glass PG. Then the operator sets the number of copies using the operation panel 210, and presses the copy switch without pressing the release switch. As illustrated in FIG. 15, the control section 230 turns on the light source 202. Then the light source 202 is moved at a predetermined speed while the light source 202 illuminates the surface of the document OG with white light, the illuminated portion being formed rectangular. The control section 230 moves the V mirror section M22 at half the speed of the light source 202 in the same direction as that of the light source 202. Due to the foregoing, the document OG is scanned. A beam of light reflected on the surface of the document OG is reflected by the first, second and third mirrors 203, 204, 205. Then the beam of light is divided into a red and a cyan component by the action of the dichroic mirror DM. Then a red image is formed on the red line sensor LS1 by the image formation lens 206, and a cyan image is formed on the cyan line sensor LS2. The scanning conducted by the image reading section AA is the pre-scanning conducted before the image formation process.

Electric currents $I_R$ and $I_C$ outputted from the red and cyan line sensors LS1 and LS2 in the pre-scanning, are respectively subjected to shading compensation by the A/D converters AD1 and AD2. At the same time, the currents are subjected to the A/D conversion, so that the currents are converted into the digital image signals $V_r$ and $V_C$ of 6 bits, and then the image signals are sent to the color separation tables 231A and 231B. The color separation tables 231A and 231B send a color signal of 8 bits corresponding to the digital image signal to the control section 230.

The control section 230 compares a color code signal of 3 bits sent out from the color separation table 231A, with the first setting color code data "110" corresponding to the background color of the specific document, wherein the first setting color code data "110" is previously set. In the case of the construction in which the original is discriminated by the background color, it is discriminated that the document OG to be copied is the original of the specific document. In the case of the construction in which the second generation copy is discriminated by the background color, it is discriminated that the document OG is the second generation copy of the specific document.

The control section 230 compares a color code signal of 3 bits sent out from the color separation table 231B, with the first setting color code data "110" corresponding to the row of indication characters of the specific document, wherein the first setting color code data "110" is previously set. In the case of the construction in which the original is discriminated by the row of indication characters, it is discriminated that the document OG to be copied is the original of the specific document. In the case of the construction in which the second generation copy is discriminated by the row of indication characters, it is discriminated that the document OG is the second generation copy of the specific document.

In the case where the color code signals sent from the color separation tables 231A, 231B do not coincide with the first and second specific color codes, the control section 230 continues the image forming process following the pre-scanning operation. In the case where only the color code signal sent from the color separation table 231A coincides with the first specific color code as a result of the comparison, since the control section 230 does not receive a release signal as described before, in accordance with the programming in the first specific document prohibition mode, a display such as "Prohibition of a Confidential Document", "Prohibition of Unapproved Copying Operation", "Prohibition of Enterprise Confidential", or "Prohibition of Business Confidential" is made on the liquid crystal display on the operation panel 210, so that the operator can be given a caution, and the following image forming process is not carried out. Further, even when a copying command signal is continuously given by the operation panel 210, the image forming operation is not carried out. Due to the foregoing, the copying operation of the specific document can be prohibited. In the case where only the color code signal sent from the color separation table 231B coincides with the second specific color code as a result of the comparison, since the control section 230 does not receive a release signal as described before, in accordance with the programming in the first specific document prohibition mode, a display, such as "Confidential", "Unapproved Copy", "Enterprise Confidential", or "Business Confidential", is made on the liquid crystal display on the operation panel 210, so that the operator can be given a caution, and the following image forming process is not carried out. Due to the foregoing, the copying operation of the specific document of the second generation and after that can be prohibited. The operation of the first specific document prohibition mode is described above. According to the first specific document prohibition mode, not only the copying operation of the specific document but also the generation copying operation is prohibited.

Next, the operation in the second specific document prohibition mode will be described as follows.

When the release switch is pressed, a release signal is sent. When the control section 230 received this release signal from the operation panel 210, the operation in the second specific document prohibition mode is carried out. Although the color code of 3 bits sent out from the color separation table 231A has coincided with the first specific color code data "110" corresponding to the background color of the specific document, a display, such as "Confidential", "Unapproved Copy", "Enterprise Confidential", or "Business Confidential", is made on the display of the operation panel 210. Therefore, only attention is caused to the operator, and the specific image forming processing is continued. At this time, the color code data of 3 bits sent out from the color separation table 231B does not coincide with the second specific color code data "110" that has been previously set, because the control section 230 recognizes not only the color code signal but also the coincidence of the density signal.

In accordance with the KNC (Konica New Process), the specific image forming process will be explained, wherein the KNC is an image forming process in which a plurality of layers of toner images are formed on the image forming body 220.

In order to erase the image hysteresis, the image forming body 220 is discharged when exposure is conducted by the PCL in which a light emitting diode is used. Then the circumferential surface of the image forming body 220 is given a uniform electric charge of VH (−600 to −800 V) by the scorotron charger 221 having a grid and discharging wire, the electric potential of which is maintained at VG (−550 to −850 V).

The writing section CC forms a latent image in the primary scanning direction when a laser beam is irradiated on the image forming body 220 in accordance with a color signal. By the effect of the rotation of the image forming body 220, a latent image is also formed in the subsidiary scanning direction. In this way, a latent image can be formed on the circumferential surface of the image forming body 220 when image exposure is conducted in both the primary and subsidiary scanning direction. In this example, exposure is conducted on a character portion, so that the electric potential of the character portion becomes low, that is, the electric potential of the character portion becomes $V_L$ (−100 to 0 V). In this way, what is called a reversal latent image is formed.

Around the circumference of the image forming body 220, the developing units 222Y, 222M, 222C and 222BK are disposed, in which developers containing yellow, magenta, cyan and black toners and carrier are accommodated.

Each of the developing units 222Y, 222M, 222C and 222BK includes a developing sleeve in which a magnet is accommodated, and developer is held on the developing sleeve by the action of electrostatic force and conveyed to the developing region. At this time, the layer thickness of developer is regulated by a layer forming rod, so that the layer thickness is 300 to 600 μm on the developing sleeve. The developer includes carrier and toner, wherein a carrier particle is composed of a core made of ferrite and the core is coated with insulating resin, and a toner particle is made of pigment of polyester, electric charge controlling agent, silica and titanium oxide.

A gap between the developing sleeve and the image forming body 220 in the developing region is larger than the layer thickness of developer, that is, the gap is 0.4 to 1.0 mm. An AC bias of $V_{AC}$ (1.5 to 3.0 $KV_{p-p}$) and a DC bias of $V_{DC}$ (−500 to −700 V) are superimposed and impressed in the gap. Since the polarity of $V_{DC}$ and $V_H$ and that of toner are the same, the toner particles are released from the carrier particles, and they are not deposited on a portion of electric potential $V_H$ which is higher than $V_{DC}$, but they are deposited on a portion of electric potential $V_L$ which is lower than $V_{DC}$. In this way, the latent image can be made visual. This development is reversal development. In this way, visualization of the first color is completed.

The specific image forming process will be described as follows. In the image exposing process conducted by the writing section CC, a hatched portion is formed in the background by at least one of the developing units 222Y, 222M, 222C. Alternatively, the background is reproduced by a thin intermediate color belonging to the second specific region in the color separation map shown in FIG. 13. Further, the above methods are jointly used. Furthermore, the specific mark may be formed in the manner of a rough halftone dot.

In the image forming process of the second color, the image forming body is uniformly charged by the scorotron charger 221, and a latent image of the second color is formed by the writing section CC in accordance with the image data of the second color. Due to the foregoing, a latent image of the document and that of the background including a hatched portion are formed. In this case, the discharging operation that has been conducted in the first color image forming process is not performed in order to prevent the toner particles deposited on the first color image portion from scattering due to a sharp decrease in the electric potential.

While the photosensitive layer on the image forming body 220, the electric potential of which is $V_H$, the same latent image as that of the first color is formed in a portion where the first color image has not been formed. In a portion where the first color image has already been formed, a latent image of $V_M$ is formed by the light shielding effect of the deposited toner of the first color and the electric charge of toner itself. Therefore, development is performed in accordance with the potential difference between $V_M$ and $V_{DC}$. In order to keep the balance between the first and second colors, an amount of exposure of the first color is reduced, so that an intermediate electric potential satisfying the following inequality is maintained.

$$V_H > V_M(-100 \text{ to } -300) > V_L$$

With respect to the third and fourth colors, the same image forming process as that of the second color is conducted, and a visual image of 4 colors can be formed on the circumferential surface of the image forming body 220.

As described above, according to the image reproducing apparatus 200 of this example, the first generation copy of the specific document is allowed. However, due to the aforementioned KNC process, the second generation copy of the specific document is provided with a hatched portion of an intermediate color on its background, or a reproduced color of the specific mark expressing the specific document is different, and further the specific mark is reproduced in the manner of a halftone dot. Therefore, the second generation copy and after that can be easily discriminated from the first generation copy that is the original.

When the release switch is pressed, a release signal is sent. When the control section 230 received this release signal from the operation panel 210, the operation in the second specific document prohibition mode is carried out. In the case where the color code of 3 bits sent out from the color separation table 231B has coincided with the predetermined second specific color code data "110", a display of "Confidential" or "Illegal copy" is made on the display of the operation panel 210, so that attention is caused to the operator, and not only the specific image forming processing following the pre-scanning operation but also the normal image forming process is not conducted. As described above, in the second specific document prohibition mode, the second generation copying operation and after that can be prohibited.

An example of the digital image reproducing apparatus is explained above, in which the original of the specific document and the second generation copy are discriminated. Even in the analog image reproducing apparatus, the original of the specific document and the second generation copy can be discriminated.

Figure 18:
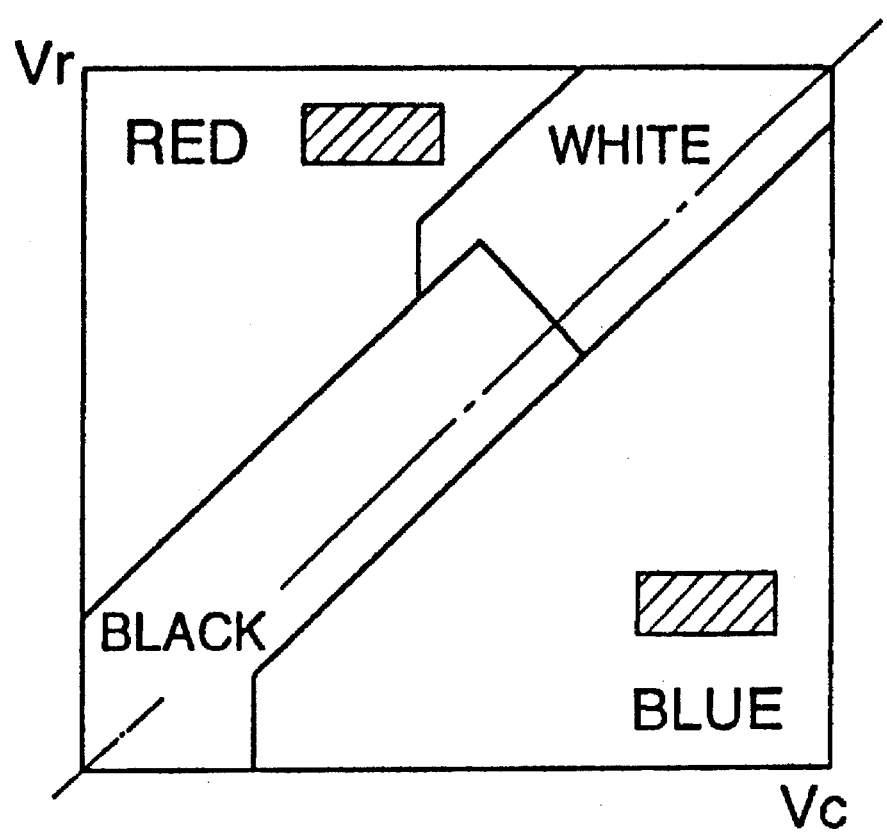
FIG. 18 is a conceptional view of the color separation map employed in an embodiment of discrimination method to discriminate between the first generation document and the second generation copy of the first generation document, only by means of background color of a specific document.

Since the analog image reproducing apparatus is excellent in discriminating the overall background color, recording sheets of different background colors may be used for the specific document and the second generation copy, and these different background colors may be previously registered. As shown in FIG. 18, when a color corresponding to a hatched portion in the red region and a color corresponding to a hatched portion in the blue region are used for the background colors of the specific document and the second generation copy, it is possible to discriminate between the original of the specific document and the second generation copy. Of course, any combinations of colors may be adopted for the background colors. The color combination may be appropriately determined in accordance with the accuracy of the judging means.

Since the image reproducing apparatus 200 of this example is constructed as explained above, the first generation copying operation of the specific document can be allowed, however, the second generation copying operation and after that can be prevented.

What is claimed is:

1. An image forming apparatus with an unapproved copy preventing means, comprising:

document supporting means for supporting an original document;

irradiating means for irradiating said original document with a light beam;

detecting means for detecting a reflection light from said original document which is irradiated with said light beam, and for generating detection signals according to the detection of said reflection light;

converting means for converting said detection signals to digital image signals;

first determining means for determining whether said original document is a first generation document according to said digital image signals;

second determining means for determining whether said original document is a second generation copy of said first generation document according to said digital image signals;

control means for preventing a copying operation of said image forming apparatus when said first and second determining means determines that said document is one of said first generation document and said second generation copy of said first generation document;

image forming means for forming an image of said document on a recording sheet with a plurality of color developers; and wherein said control means includes means for controlling said image forming means so that said image forming means forms an indication character with at least one of said plurality of color developers except a black color developer when said first determining means determines that said document is said first generation document.

2. The image forming apparatus of claim 1, further comprising:

a display means for displaying prohibition of a copying operation when either said first determining means determines that said document is said first generation document or said second determining means determines that said document is said second generation copy of said first generation document.

3. The image forming apparatus of claim 1, wherein said first determining means and said second determining means each include:

a color separating means for determining a color of said digital image signals and for generating color signals corresponding to said color of said digital image signals;

said color separating means including:
a color map with which a color of said digital image signals is determined; and
a specific color region, which corresponds to at least one of a color of a specific mark on said first generation document and a color of a specific mark on said second generation copy of said first generation document, is provided in said color map; and wherein:

said first determining means and said second determining means respectively determine whether said document is the first generation copy or the second generation copy on the basis of said color signal.

4. The image forming apparatus of claim 1, further comprising:

memory means for storing a dot image data of a specific mark which indicates that said document prohibits an unapproved copy.

5. An image forming apparatus with an unapproved copy preventing means, comprising:

document supporting means for supporting an original document;

an irradiating means for irradiating said original document with a light beam;

detecting means for detecting a reflection light from said original document which is irradiated with said light beam, and for generating detection signals according to the detection of said reflection light;

converting means for converting said detection signals to digital image signals;

memory means for storing a dot image data of a specific mark, which specific mark indicates that said document prohibits an unapproved copy, according to said digital image signals;

determining means for determining whether said original document is one of a first generation document and a second generation copy of said first generation document, according to said dot image data stored in said memory means;

control means for preventing a copying operation of said image forming apparatus when said determining means determines that said document is one of the first generation document and a second generation copy of said first generation document;

an image forming means for forming an image of said document on a recording sheet with a plurality of color developers; and wherein said control means includes means for controlling said image forming means so that said image forming means forms said specific mark with a color developer which is different from an original color of said specific mark, marked on said first generation document, when said determining means determines that said document is said first generation document.

6. An image forming apparatus with an unapproved copy preventing means, comprising:

document supporting means for supporting an original document;

irradiating means for irradiating said original document with a light beam;

detecting means for detecting a reflection light from said original document which is irradiated with said light beam, and for generating detection signals according to the detection of said reflection light;

converting means for converting said detection signals to digital image signals;

image forming means for forming an image of said document on a recording sheet with a plurality of color developers;

first judging means for determining whether said original document is a first generation document according to said digital image signals;

control means for forming a predetermined indication on the recording sheet by said image forming means when said first judging means determines that the original document supported by said document supporting means is the first generation document;

second judging means for determining whether said original document is a second generation copy of said first generation document according to said predetermined indication; and wherein said control means includes means for preventing a copying operation of said image forming means when said second judging means determines that said original document supported by said document supporting means is the second generation copy.

7. The image forming apparatus of claim 6, wherein said predetermined indication includes a specific color different from the original color on the first generation document.

8. The image forming apparatus of claim 7, wherein said specific color is different from the color on a specific mark of the first generation document.

9. The image forming apparatus of claim 7, further comprising:

color separating means for separating the color represented by said digital image signals into one of a plurality of predetermined colors and for generating a color code signal; and wherein said specific color is separated to one of said plurality of predetermined colors, and said color separating means generates a specific color code for said specific color.

10. The image forming apparatus of claim 6, further comprising:

mode selecting means for selecting a first mode and a second mode;

wherein said first mode said control means prevents the copying operation of said image forming means when said first judging means determines said document is the first generation document, and in said second mode said control means carries out the copying operation of said image forming means when said first judging means determines said document is the first generation document.

11. The image forming apparatus of claim 6, further comprising:

display means for displaying a caution of a copying operation when either said first judging means determines that said document is the first generation document or said second judging means determines that said document is the second generation copy of the first generation document.

* * * * *